United States Patent
Kim et al.

(10) Patent No.: US 10,790,952 B2
(45) Date of Patent: Sep. 29, 2020

(54) METHOD AND APPARATUS FOR RECEIVING DOWNLINK PHYSICAL BROADCASTING CHANNEL IN RADIO ACCESS SYSTEM THAT SUPPORTS NARROW BAND INTERNET OF THINGS

(71) Applicant: LG ELECTRONICS INC., Seoul (KR)

(72) Inventors: Bonghoe Kim, Seoul (KR); Hyunsoo Ko, Seoul (KR); Yunjung Yi, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/757,639

(22) PCT Filed: Sep. 8, 2016

(86) PCT No.: PCT/KR2016/010075
§ 371 (c)(1),
(2) Date: Mar. 5, 2018

(87) PCT Pub. No.: WO2017/043878
PCT Pub. Date: Mar. 16, 2017

(65) Prior Publication Data
US 2019/0028243 A1    Jan. 24, 2019

Related U.S. Application Data

(60) Provisional application No. 62/215,169, filed on Sep. 8, 2015.

(51) Int. Cl.
*H04W 72/04*  (2009.01)
*H04L 5/00*  (2006.01)
(Continued)

(52) U.S. Cl.
CPC .............. *H04L 5/005* (2013.01); *H04J 11/00* (2013.01); *H04J 11/0069* (2013.01);
(Continued)

(58) Field of Classification Search
CPC . H04L 5/005; H04L 27/2655; H04L 27/2613; H04L 5/0053; H04L 5/00;
(Continued)

(56) References Cited

U.S. PATENT DOCUMENTS

2014/0133478 A1  5/2014  Malladi et al.
2014/0301305 A1  10/2014  Xu et al.
(Continued)

FOREIGN PATENT DOCUMENTS

| CN | 106664175 | 5/2017 |
| KR | 1020140128340 | 11/2014 |
| WO | 2014165838 | 10/2014 |

OTHER PUBLICATIONS

R1-152845 (3GPP TSG RAN WG1 Meeting #81, Fukuoka, Japan, May 25-29, 2015, Samsung, "Considerations of legacy SRS impact on uplink transmission from low-cost UE") (Year: 2015).*
(Continued)

*Primary Examiner* — Moo Jeong
(74) *Attorney, Agent, or Firm* — Lee Hong Degerman Kang & Waimey

(57) ABSTRACT

The present invention may provide a method and apparatuses for transmitting and receiving a downlink/uplink physical channel when an in-band operation is supported by a radio access system that supports a narrow band Internet of things (NB-IoT). As an embodiment of the present invention, a method for receiving a physical downlink
(Continued)

broadcasting channel (M-PBCH) by a terminal in a radio access system that supports a narrow band Internet of things (NB-IoT) system may comprise the steps of: receiving a higher layer signal indicating an in-band deployment mode; receiving a narrow band primary synchronization signal (M-PSS) and a narrow band secondary synchronization signal (M-SSS), configured for the NB-IoT systems; obtaining a cell identifier (N-Cell ID) of the NB-IoT system from the M-SSS; and receiving an M-PBCH using the N-Cell ID in the in-band deployment mode. In this instance, the in-band deployment mode indicates that the NB-IoT system is configured in a band of a legacy LTE system.

18 Claims, 18 Drawing Sheets

(51) Int. Cl.
  *H04L 27/26* (2006.01)
  *H04J 11/00* (2006.01)
(52) U.S. Cl.
  CPC ............ *H04J 11/0083* (2013.01); *H04L 5/00* (2013.01); *H04L 5/0053* (2013.01); *H04L 27/2613* (2013.01); *H04L 27/2655* (2013.01); *H04J 2011/0096* (2013.01); *H04W 72/042* (2013.01)
(58) Field of Classification Search
  CPC .. H04L 5/0048; H04L 5/0023; H04W 72/042; H04J 11/0069; H04J 11/00; H04J 2011/0096; H04J 11/0083; H04J 2211/005
  See application file for complete search history.

(56) References Cited

U.S. PATENT DOCUMENTS

| 2014/0321370 | A1  | 10/2014 | Chen et al. |              |
|--------------|-----|---------|-------------|--------------|
| 2015/0063148 | A1  | 3/2015  | Sadek       |              |
| 2016/0037514 | A1* | 2/2016  | Xiong       | H04W 4/70    |
|              |     |         |             | 370/336      |
| 2018/0227148 | A1* | 8/2018  | Chatterjee  | H04L 5/005   |
| 2018/0241495 | A1* | 8/2018  | Xue         | H04J 11/00   |

OTHER PUBLICATIONS

PCT International Application No. PCT/KR2016/010075, Written Opinion of the International Searching Authority dated Dec. 12, 2016, 18 pages.
Ericsson LM, "Conclusion on NB-LTE candidate technique for SI 'Cellular System Support for Ultra Low Complexity and Low Throughput Internet of Things'", 3GPP TSG GERAN Meeting #67, GP-150827, Aug. 2015, 9 pages.
State Intellectual Property Office of the People's Republic of China Application Serial No. 201680052141.5, Office Action dated Nov. 27, 2018, 13 pages.
European Patent Office Application Serial No. 16844694.6, Search Report dated Apr. 23, 2019, 5 pages.
Ericsson, et al., "Narrowband LTE—Concept Description", 3GPP TSG GERAN Meeting #67, GP-150863, Aug. 2015, 9 pages.
Mediatek, "Resource allocation and DCI format design", 3GPP TSG RAN WG1 Meeting #82, R1-154711, Aug. 2015, 4 pages.
Interdigital, "SIB transmission for MTC", 3GPP TSG RAN WG1 Meeting #81, R1-153246, May 2015, 3 pages.
Huawei, et al., "Obtaining information of neighboring cells CRS", 3GPP TSG RAN WG1 Meeting #68, R1-120026, Feb. 2012, 2 pages.
Nokia, et al., "Assumptions and Constraints for Supporting 1.4 MHz Low Cost MTC UE", 3GPP TSG RAN WG1 Meeting #79, R1-144990, XP050885640, Nov. 2014, 4 pages.

* cited by examiner

FIG. 8
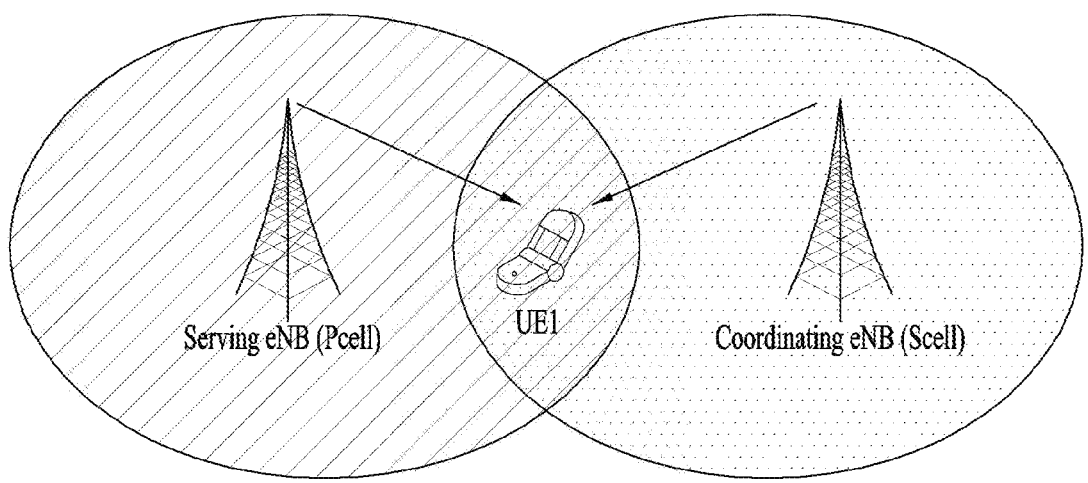
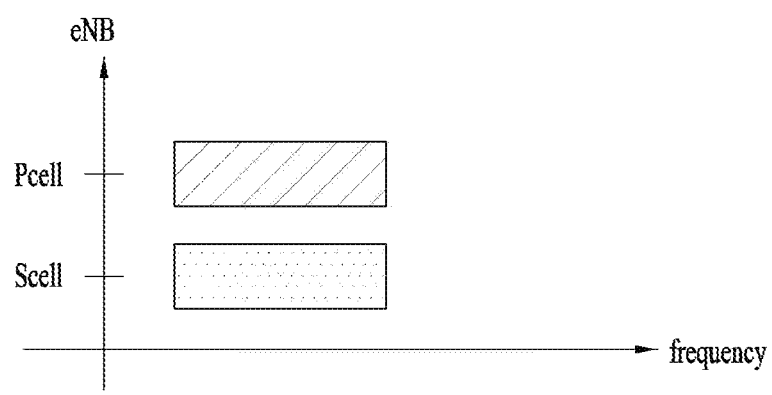

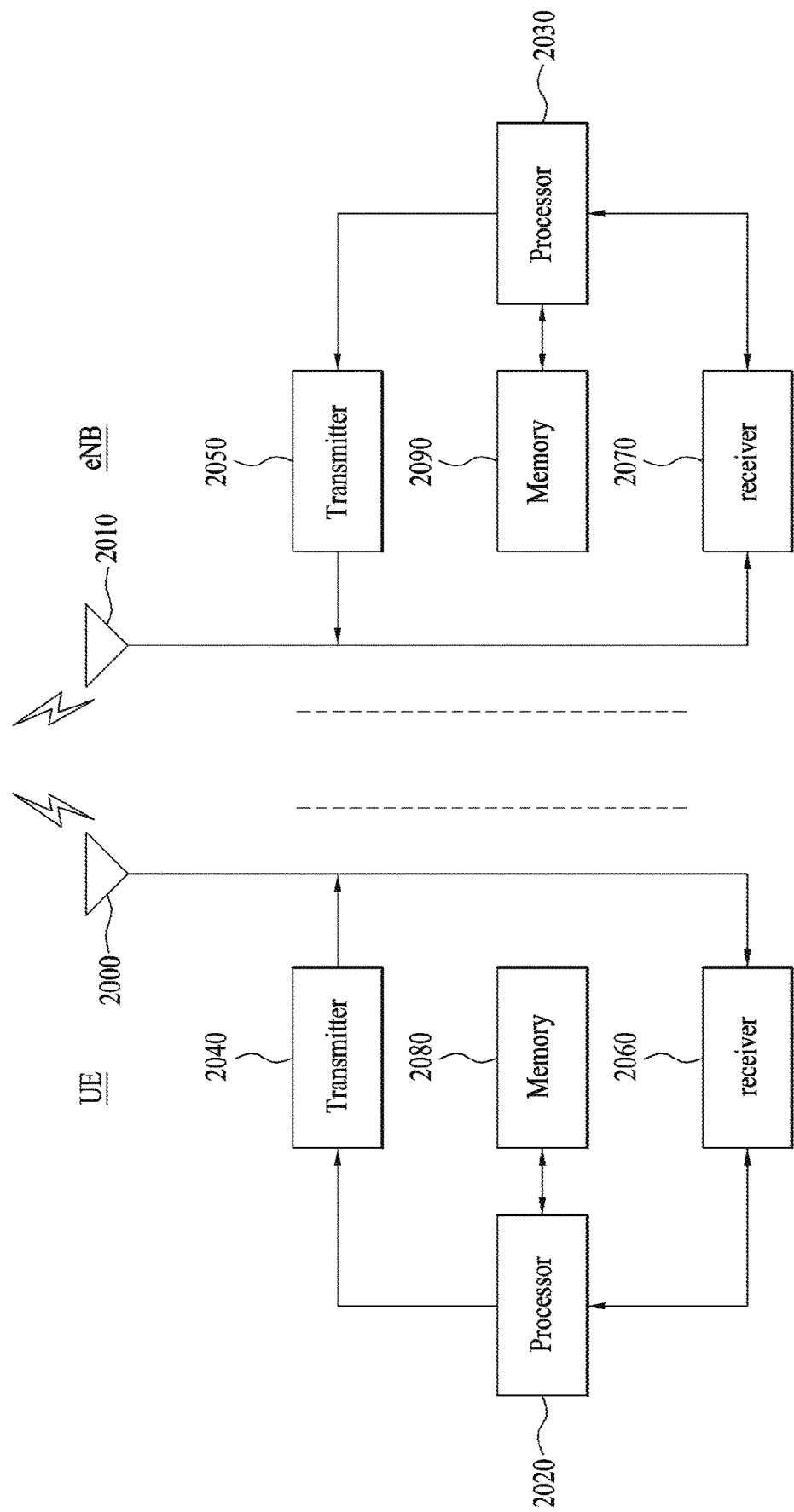

ical Solutions
METHOD AND APPARATUS FOR RECEIVING DOWNLINK PHYSICAL BROADCASTING CHANNEL IN RADIO ACCESS SYSTEM THAT SUPPORTS NARROW BAND INTERNET OF THINGS

CROSS-REFERENCE TO RELATED APPLICATIONS

This application is the National Stage filing under 35 U.S.C. 371 of International Application No. PCT/KR2016/010075, filed on Sep. 8, 2016, which claims the benefit of U.S. Provisional Application No. 62/215,169, filed on Sep. 8, 2015, the contents of which are all hereby incorporated by reference herein in their entirety.

TECHNICAL FIELD

The present invention relates to a wireless access system supporting Narrowband Internet of Things (NB-IoT), and more particularly, to a method and apparatus for transmitting and receiving downlink/uplink physical channels when the wireless access system supports in-band operation.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

DISCLOSURE OF THE INVENTION

Technical Task

An object of the present invention is to provide a method for transmitting and receiving data and/or control information for an NB-IoT user equipment.

Another object of the present invention is to provide a method for transmitting and receiving a downlink and/or uplink physical channel in an NB-IoT system.

A further object of the present invention is to provide a method for transmitting and receiving a physical downlink broadcast channel in an NB-IoT system.

Still another object of the present invention is to define an M-CRS and provide a method for transmitting and receiving a legacy CRS and a physical downlink broadcast channel.

A still further object of the present invention is to provide apparatuses for supporting the above-described methods.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Technical Solutions

The present invention provides a method and apparatuses for transmitting and receiving downlink/uplink physical channels in a wireless access system supporting NB-IoT when the wireless access system supports in-band operation.

In a first aspect of the present invention, provided herein is a method for receiving a physical downlink broadcast channel (M-PBCH) by a user equipment (UE) in a wireless access system supporting a narrowband Internet of Things (NB-IoT) system, including: receiving a higher layer signal indicating an in-band deployment mode; receiving a narrowband primary synchronization signal (M-PSS) and a narrowband secondary synchronization signal (M-SSS), which are configured for the NB-IoT system; obtaining a cell identifier (N-Cell ID) of the NB-IoT system from the M-PSS and the M-SSS; and receiving the M-PBCH using the N-Cell ID in the in-band deployment mode. In this case, the in-band deployment mode may indicate that the NB-IoT system is set within a band of a legacy long term evolution (LTE) system.

In an embodiment of the first aspect, receiving the M-PBCH may include calculating a frequency shift (v-shift) value for a cell-specific reference signal (CRS) of a legacy system using the N-Cell ID and estimating resource elements (REs) to which the CRS is allocated by considering the v-shift value. In this case, the UE may calculate the v-shift value by assuming a maximum CRS antenna port number that can be supported by the legacy system.

At this time, the UE may receive the M-PBCH in a resource region except the estimated REs to which the CRS is allocated.

In another embodiment of the first aspect, receiving the M-PBCH may include calculating a frequency shift (v-shift) value for a cell-specific reference signal (M-CRS) of the NB-IoT system using the N-Cell ID and estimating resource elements (REs) to which the M-CRS is allocated by considering the v-shift value. In this case, the UE may calculate the v-shift value by assuming the number of antenna ports through which the M-CRS is transmitted to be equal to a specific value.

The UE may receive the M-PBCH in a resource region except the estimated REs to which the M-CRS is allocated.

In a further embodiment of the first aspect, receiving the M-PBCH may further include calculating a v-shift value for a cell-specific reference signal (M-CRS) of the NB-IoT system using the N-Cell ID and estimating REs to which the M-CRS is allocated by considering the v-shift value. In this case, the M-PBCH may be received in a resource region except the REs to which the CRS is allocated and the REs to which the M-CRS is allocated.

In a second aspect of the present invention, provided herein is a user equipment (UE) for receiving a physical downlink broadcast channel (M-PBCH) in a wireless access system supporting a narrowband Internet of Things (NB-IoT) system, including a receiver and a processor configured to control the receiver. In this case, the processor may be configured to: receive a higher layer signal indicating an in-band deployment mode by controlling the receiver; receive a narrowband primary synchronization signal (M-PSS) and a narrowband secondary synchronization signal (M-SSS), which are configured for the NB-IoT system, by controlling the receiver; obtain a cell identifier (N-Cell ID) of the NB-IoT system from the M-PSS and the M-SSS; and receive the M-PBCH using the N-Cell ID in the in-band deployment mode by controlling the receiver. At this time, the in-band deployment mode may indicate that the NB-IoT system is set within a band of a legacy long term evolution (LTE) system.

In an embodiment of the second aspect, to receive the M-PBCH, the processor may be further configured to: calculate a frequency shift (v-shift) value for a cell-specific reference signal (CRS) of a legacy system using the N-Cell ID; and estimate resource elements (REs) to which the CRS is allocated by considering the v-shift value. In this case, the processor may be configured to calculate the v-shift value by assuming a maximum CRS antenna port number that can be supported by the legacy system.

At this time, the processor may be configured to receive the M-PBCH in a resource region except the estimated REs to which the CRS is allocated by controlling the receiver.

In another embodiment of the second aspect, the processor may be further configured to: calculate a frequency shift (v-shift) value for a cell-specific reference signal (M-CRS) of the NB-IoT system using the N-Cell ID; and estimate resource elements (REs) to which the M-CRS is allocated by considering the v-shift value. In this case, the processor may be configured to calculate the v-shift value by assuming the number of antenna ports through which the M-CRS is transmitted to be equal to a specific value.

At this time, the processor may be configured to receive the M-PBCH in a resource region except the estimated REs to which the M-CRS is allocated by controlling the receiver.

In a further embodiment of the second aspect, to receive the M-PBCH, the processor may be further configured to: calculate a v-shift value for a cell-specific reference signal (M-CRS) of the NB-IoT system using the N-Cell ID; and estimate REs to which the M-CRS is allocated by considering the v-shift value. In this case, the processor may be configured to receive the M-PBCH in a resource region except the REs to which the CRS is allocated and the REs to which the M-CRS is allocated by controlling the receiver.

It is to be understood that both the foregoing general description and the following detailed description of the present disclosure are exemplary and explanatory and are intended to provide further explanation of the disclosure as claimed.

Advantageous Effects

Accordingly, the present invention provides the following effects and/or advantages.

First, data and/or control information for an NB-IoT UE can be efficiently transmitted and received.

Second, it is possible to provide methods for transmitting and receiving uplink and downlink physical channels for a UE in an in-band deployment mode.

Third, a collision between an RE to which an M-PBCH is allocated and an RE to which an M-CRS is allocated can be prevented in an environment where the M-CRS is defined for an NB-IoT UE.

Fourth, even in an environment where an M-CRS for an NB-IoT UE and a legacy CRS coexist, an M-PBCH can be accurately transmitted and received.

It will be apparent to those skilled in the art that various modifications and variations can be made in the present invention within the scope of the appended claims and the embodiments described in the descriptions hereinafter.

DESCRIPTION OF DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings:

FIG. 8 is a conceptual view of a Coordinated Multi-Point (CoMP) system operating in a CA environment;

FIG. 20 illustrates apparatuses for implementing the methods described with reference to FIGS. 1 to 19.

BEST MODE FOR INVENTION

Figure 1:
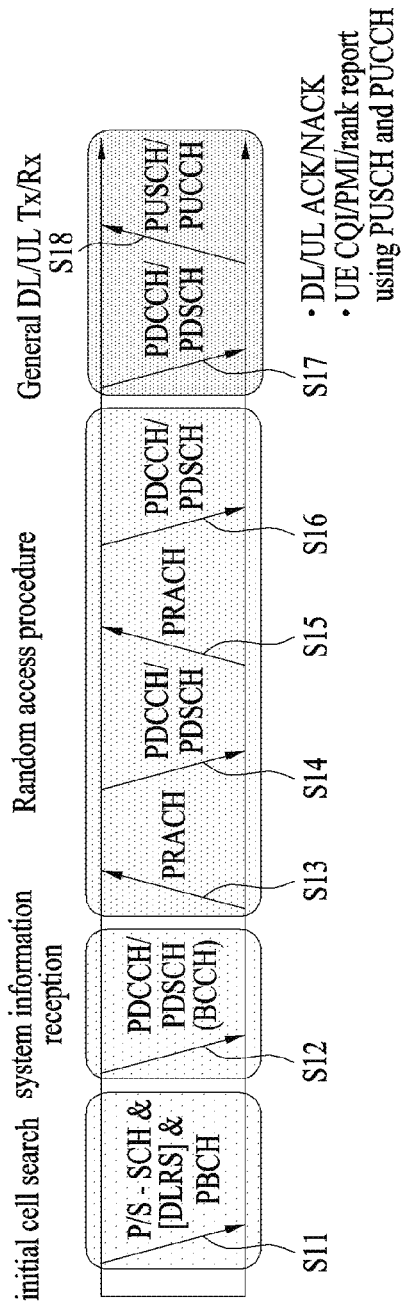
FIG. 1 is a view illustrating physical channels and a signal transmission method using the physical channels.

In the embodiments of the present invention, which will be described in detail below, a method and apparatuses for using a heterogeneous network signal to measure a position of a user equipment are provided.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an UpLink (UL). Likewise, the UE may serve as a reception end and the BS may serve as a transmission end, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

Hereinafter, 3GPP LTE/LTE-A systems are explained, which are examples of wireless access systems.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1. 3GPP LTE/LTE-A System

In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

1.1 System Overview

FIG. 1 illustrates physical channels and a general signal transmission method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

Figure 2:
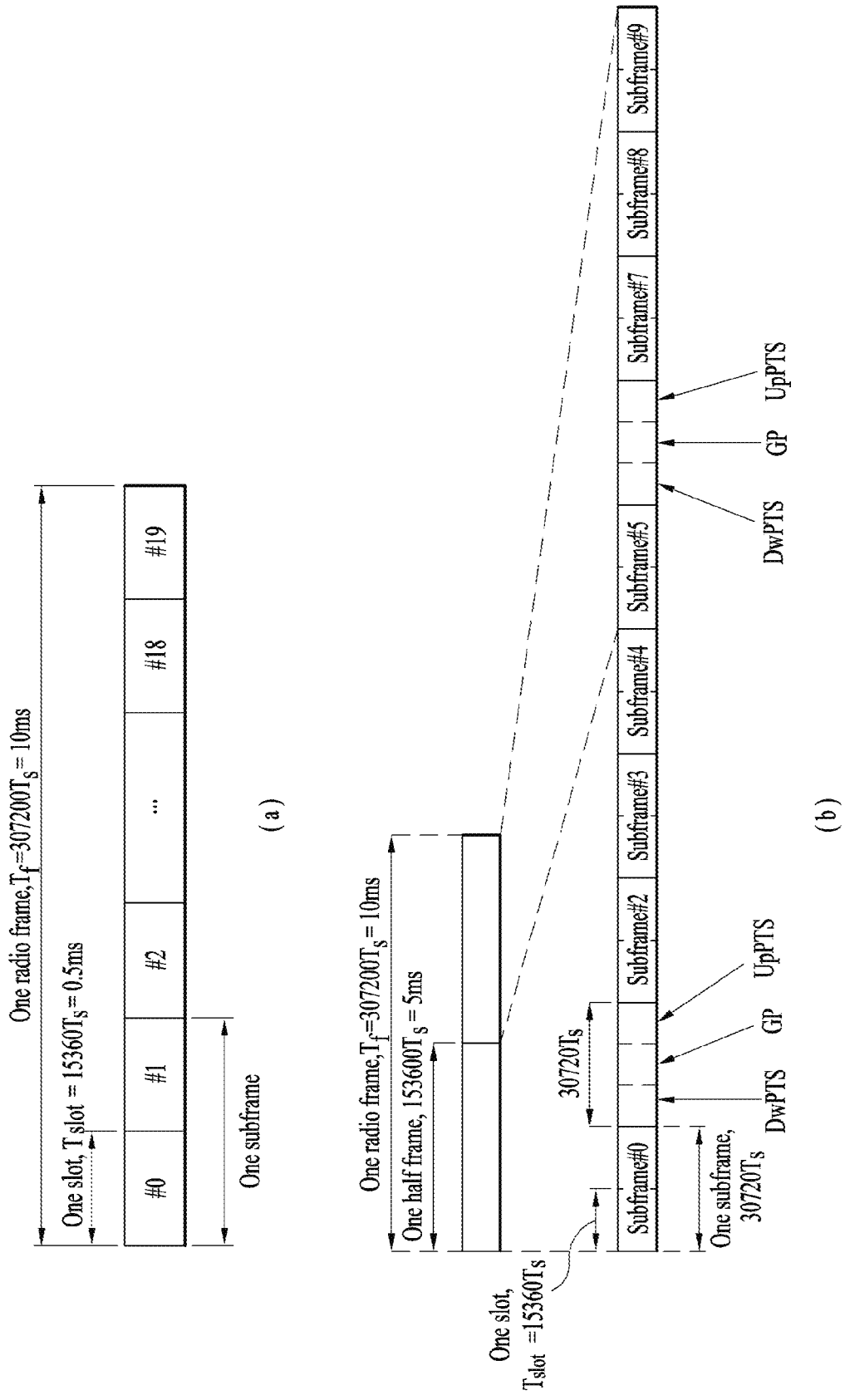
FIG. 2 is a view illustrating exemplary radio frame structures.

FIG. 2 illustrates exemplary radio frame structures used in embodiments of the present disclosure.

FIG. 2($a$) illustrates frame structure type 1. Frame structure type 1 is applicable to both a full Frequency Division Duplex (FDD) system and a half FDD system.

One radio frame is 10 ms (Tf=307200·Ts) long, including equal-sized 20 slots indexed from 0 to 19. Each slot is 0.5 ms (Tslot=15360·Ts) long. One subframe includes two successive slots. An ith subframe includes 2ith and (2i+1)th slots. That is, a radio frame includes 10 subframes. A time required for transmitting one subframe is defined as a Transmission Time Interval (TTI). Ts is a sampling time given as Ts=1/(15 kHz×2048)=3.2552x10-8 (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain Since 01-DMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2($b$) illustrates frame structure type 2. Frame structure type 2 is applied to a Time Division Duplex (TDD) system. One radio frame is 10 ms (Tf=307200·Ts) long, including two half-frames each having a length of 5 ms (=153600·Ts) long. Each half-frame includes five subframes each being 1 ms (=30720·Ts) long. An ith subframe includes 2ith and (2i+1)th slots each having a length of 0.5 ms (Tslot=15360·Ts). Ts is a sampling time given as Ts=1/(15 kHz×2048)=3.2552x10-8 (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

[Table 1] below lists special subframe configurations (DwPTS/GP/UpPTS lengths).

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Figure 3:
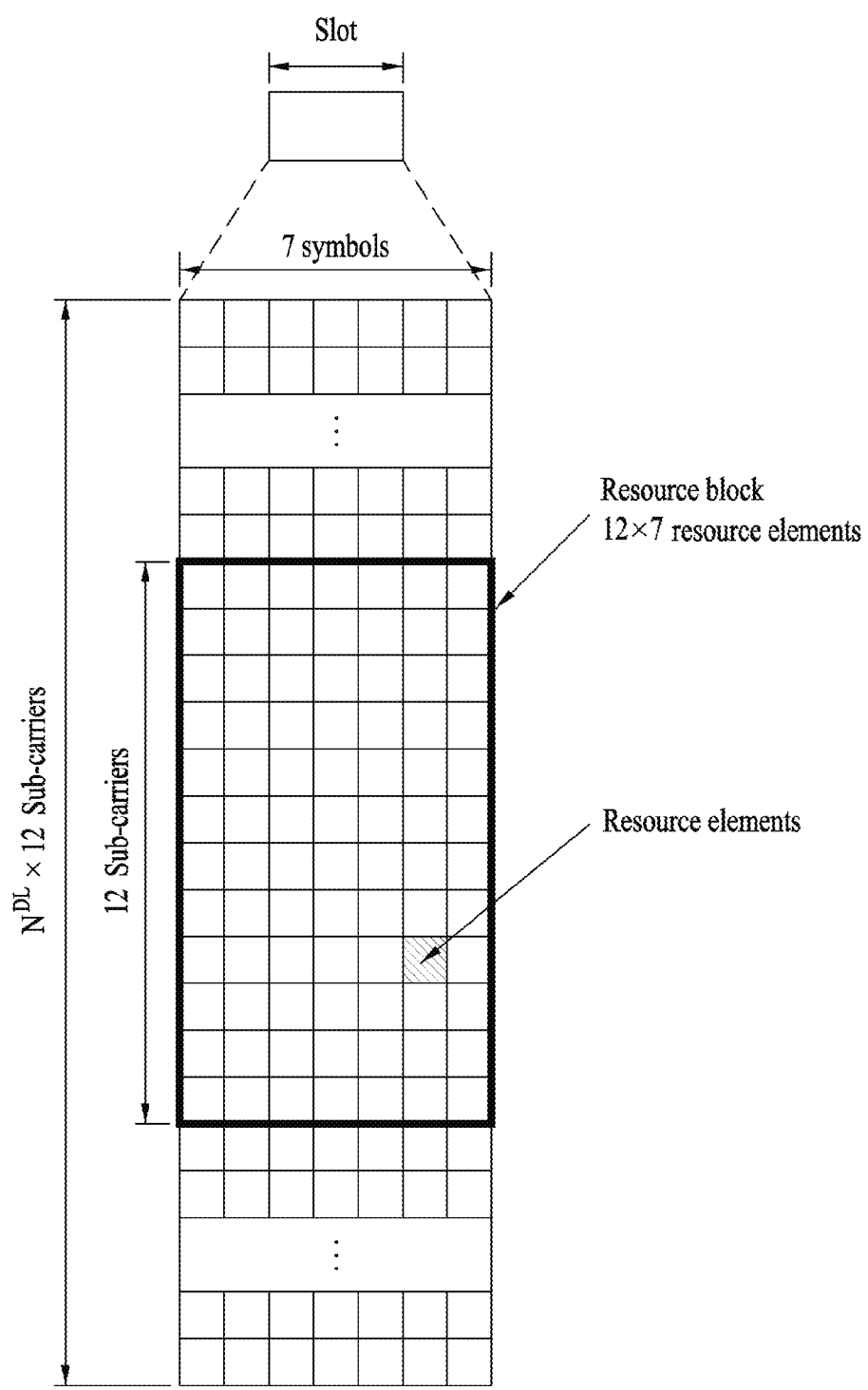
FIG. 3 is a view illustrating an exemplary resource grid for the duration of a downlink slot.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, NDL depends on a DL transmission bandwidth. A UL slot may have the same structure as a DL slot.

Figure 4:
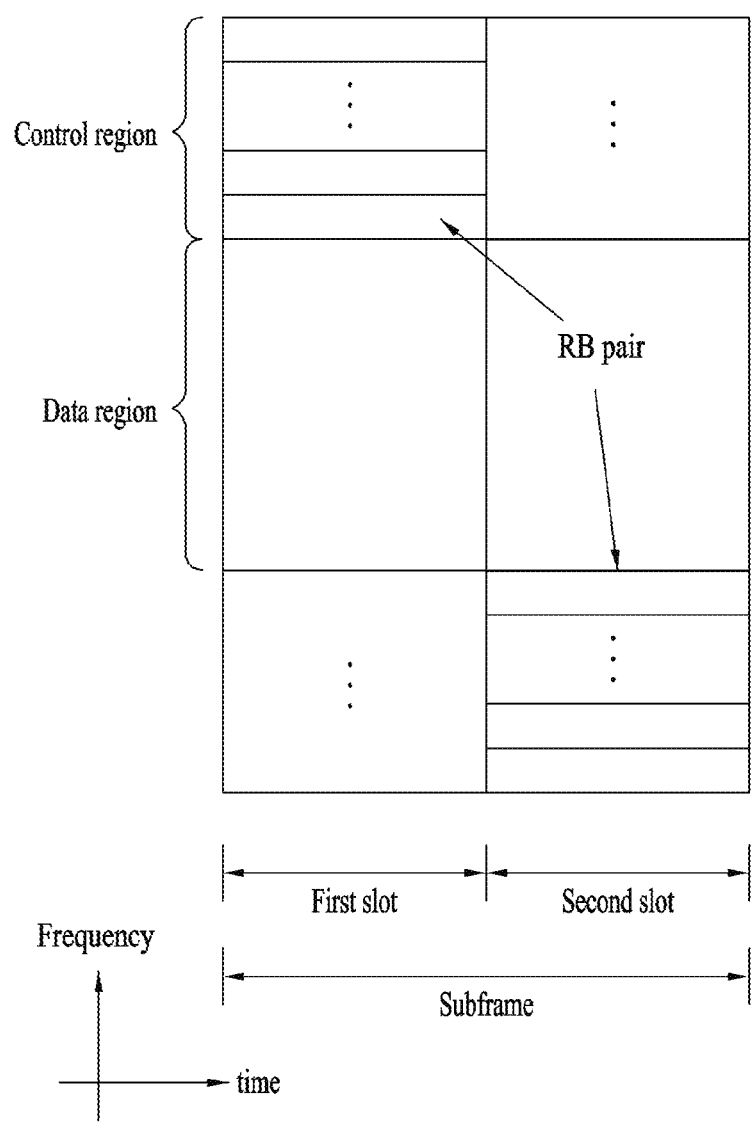
FIG. 4 is a view illustrating an exemplary structure of an uplink subframe.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

Figure 5:
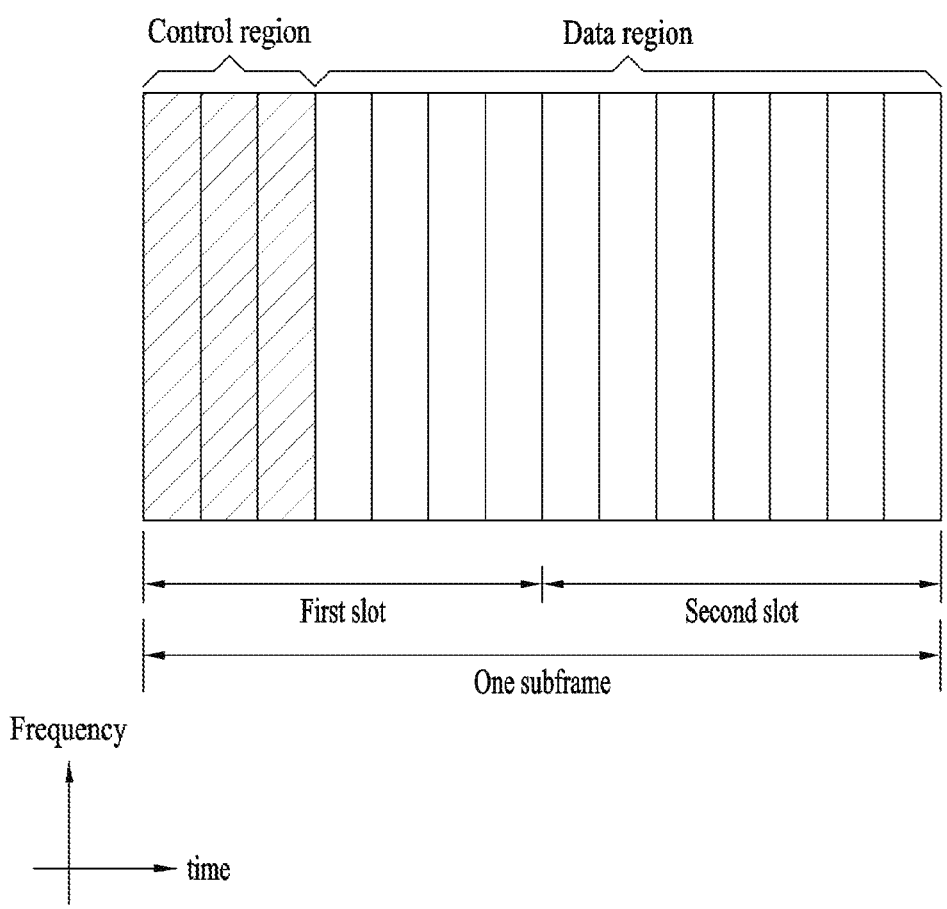
FIG. 5 is a view illustrating an exemplary structure of a downlink subframe.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

1.2 Physical Downlink Control Channel (PDCCH)

1.2.1 PDCCH Overview

The PDCCH may deliver information about resource allocation and a transport format for a Downlink Shared Channel (DL-SCH) (i.e. a DL grant), information about resource allocation and a transport format for an Uplink Shared Channel (UL-SCH) (i.e. a UL grant), paging information of a Paging Channel (PCH), system information on the DL-SCH, information about resource allocation for a higher-layer control message such as a random access response transmitted on the PDSCH, a set of Tx power control commands for individual UEs of a UE group, Voice Over Internet Protocol (VoIP) activation indication information, etc.

A plurality of PDCCHs may be transmitted in the control region. A UE may monitor a plurality of PDCCHs. A PDCCH is transmitted in an aggregate of one or more consecutive Control Channel Elements (CCEs). A PDCCH made up of one or more consecutive CCEs may be transmitted in the control region after subblock interleaving. A CCE is a logical allocation unit used to provide a PDCCH at a code rate based on the state of a radio channel A CCE includes a plurality of RE Groups (REGs). The format of a PDCCH and the number of available bits for the PDCCH are determined according to the relationship between the number of CCEs and a code rate provided by the CCEs.

1.2.2 PDCCH Structure

A plurality of PDCCHs for a plurality of UEs may be multiplexed and transmitted in the control region. A PDCCH is made up of an aggregate of one or more consecutive CCEs. A CCE is a unit of 9 REGs each REG including 4 REs. Four Quadrature Phase Shift Keying (QPSK) symbols are mapped to each REG. REs occupied by RSs are excluded from REGs. That is, the total number of REGs in an OFDM symbol may be changed depending on the presence or absence of a cell-specific RS. The concept of an REG to which four REs are mapped is also applicable to other DL control channels (e.g. the PCFICH or the PHICH). Let the number of REGs that are not allocated to the PCFICH or the PHICH be denoted by NREG. Then the number of CCEs available to the system is NCCE ($=\lfloor N_{REG}/9 \rfloor$) and the CCEs are indexed from 0 to NCCE-1.

To simplify the decoding process of a UE, a PDCCH format including n CCEs may start with a CCE having an index equal to a multiple of n. That is, given CCE the PDCCH format may start with a CCE satisfying i mod n=0.

The eNB may configure a PDCCH with 1, 2, 4, or 8 CCEs. {1, 2, 4, 8} are called CCE aggregation levels. The number of CCEs used for transmission of a PDCCH is determined according to a channel state by the eNB. For example, one CCE is sufficient for a PDCCH directed to a UE in a good DL channel state (a UE near to the eNB). On the other hand, 8 CCEs may be required for a PDCCH directed to a UE in a poor DL channel state (a UE at a cell edge) in order to ensure sufficient robustness.

[Table 2] below illustrates PDCCH formats. 4 PDCCH formats are supported according to CCE aggregation levels as illustrated in [Table 2].

TABLE 2

| PDCCH format | Number of CCE (n) | Number of REG | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

A different CCE aggregation level is allocated to each UE because the format or Modulation and Coding Scheme (MCS) level of control information delivered in a PDCCH for the UE is different. An MCS level defines a code rate used for data coding and a modulation order. An adaptive MCS level is used for link adaptation. In general, three or four MCS levels may be considered for control channels carrying control information.

Regarding the formats of control information, control information transmitted on a PDCCH is called DCI. The configuration of information in PDCCH payload may be changed depending on the DCI format. The PDCCH payload is information bits. [Table 3] lists DCI according to DCI formats.

TABLE 3

| DCI Format | Description |
|---|---|
| Format 0 | Resource grants for PUSCH transmissions (uplink) |
| Format 1 | Resource assignments for single codeword PDSCH transmission (transmission modes 1, 2 and 7) |
| Format 1A | Compact signaling of resource assignments for single codeword PDSCH (all modes) |
| Format 1B | Compact resource assignments for PDSCH using rank-1 closed loop precoding (mode 6) |
| Format 1C | Very compact resource assignments for PDSCH (e.g., paging/broadcast system information) |
| Format 1D | Compact resource assignments for PDSCH using multi-user MIMO(mode 5) |

TABLE 3-continued

| DCI Format | Description |
|---|---|
| Format 2 | Resource assignments for PDSCH for closed loop MIMO operation (mode 4) |
| Format 2A | resource assignments for PDSCH for open loop MIMO operation (mode 3) |
| Format 3/3A | Power control commands for PUCCH and PUSCH with 2-bit/1-bit power adjustment |
| Format 4 | Scheduling of PUSCH in one UL cell with multi-antenna port transmission mode |

Referring to [Table 3], the DCI formats include Format 0 for PUSCH scheduling, Format 1 for single-codeword PDSCH scheduling, Format 1A for compact single-codeword PDSCH scheduling, Format 1C for very compact DL-SCH scheduling, Format 2 for PDSCH scheduling in a closed-loop spatial multiplexing mode, Format 2A for PDSCH scheduling in an open-loop spatial multiplexing mode, and Format 3/3A for transmission of Transmission Power Control (TPC) commands for uplink channels. DCI Format 1A is available for PDSCH scheduling irrespective of the transmission mode of a UE.

The length of PDCCH payload may vary with DCI formats. In addition, the type and length of PDCCH payload may be changed depending on compact or non-compact scheduling or the transmission mode of a UE.

The transmission mode of a UE may be configured for DL data reception on a PDSCH at the UE. For example, DL data carried on a PDSCH includes scheduled data, a paging message, a random access response, broadcast information on a BCCH, etc. for a UE. The DL data of the PDSCH is related to a DCI format signaled through a PDCCH. The transmission mode may be configured semi-statically for the UE by higher-layer signaling (e.g. Radio Resource Control (RRC) signaling). The transmission mode may be classified as single antenna transmission or multi-antenna transmission.

A transmission mode is configured for a UE semi-statically by higher-layer signaling. For example, multi-antenna transmission scheme may include transmit diversity, open-loop or closed-loop spatial multiplexing, Multi-User Multiple Input Multiple Output (MU-MIMO), or beamforming. Transmit diversity increases transmission reliability by transmitting the same data through multiple Tx antennas. Spatial multiplexing enables high-speed data transmission without increasing a system bandwidth by simultaneously transmitting different data through multiple Tx antennas. Beamforming is a technique of increasing the Signal to Interference plus Noise Ratio (SINR) of a signal by weighting multiple antennas according to channel states.

A DCI format for a UE depends on the transmission mode of the UE. The UE has a reference DCI format monitored according to the transmission mode configure for the UE. The following 10 transmission modes are available to UEs:

(1) Transmission mode 1: Single antenna port (port 0);
(2) Transmission mode 2: Transmit diversity;
(3) Transmission mode 3: Open-loop spatial multiplexing when the number of layer is larger than 1 or Transmit diversity when the rank is 1;
(4) Transmission mode 4: Closed-loop spatial multiplexing;
(5) Transmission mode 5: MU-MIMO;
(6) Transmission mode 6: Closed-loop rank-1 precoding;
(7) Transmission mode 7: Precoding supporting a single layer transmission, which is not based on a codebook (Rel-8);
(8) Transmission mode 8: Precoding supporting up to two layers, which are not based on a codebook (Rel-9);
(9) Transmission mode 9: Precoding supporting up to eight layers, which are not based on a codebook (Rel-10); and
(10) Transmission mode 10: Precoding supporting up to eight layers, which are not based on a codebook, used for CoMP (Rel-11).

1.2.3 PDCCH Transmission

The eNB determines a PDCCH format according to DCI that will be transmitted to the UE and adds a Cyclic Redundancy Check (CRC) to the control information. The CRC is masked by a unique Identifier (ID) (e.g. a Radio Network Temporary Identifier (RNTI)) according to the owner or usage of the PDCCH. If the PDCCH is destined for a specific UE, the CRC may be masked by a unique ID (e.g. a cell-RNTI (C-RNTI)) of the UE. If the PDCCH carries a paging message, the CRC of the PDCCH may be masked by a paging indicator ID (e.g. a Paging-RNTI (P-RNTI)). If the PDCCH carries system information, particularly, a System Information Block (SIB), its CRC may be masked by a system information ID (e.g. a System Information RNTI (SI-RNTI)). To indicate that the PDCCH carries a random access response to a random access preamble transmitted by a UE, its CRC may be masked by a Random Access-RNTI (RA-RNTI).

Then, the eNB generates coded data by channel-encoding the CRC-added control information. The channel coding may be performed at a code rate corresponding to an MCS level. The eNB rate-matches the coded data according to a CCE aggregation level allocated to a PDCCH format and generates modulation symbols by modulating the coded data. Herein, a modulation order corresponding to the MCS level may be used for the modulation. The CCE aggregation level for the modulation symbols of a PDCCH may be one of 1, 2, 4, and 8. Subsequently, the eNB maps the modulation symbols to physical REs (i.e. CCE to RE mapping).

1.2.4 Blind Decoding (BD)

A plurality of PDCCHs may be transmitted in a subframe. That is, the control region of a subframe includes a plurality of CCEs, CCE 0 to CCE NCCE,k−1. NCCE,k is the total number of CCEs in the control region of a kth subframe. A UE monitors a plurality of PDCCHs in every subframe. This means that the UE attempts to decode each PDCCH according to a monitored PDCCH format.

The eNB does not provide the UE with information about the position of a PDCCH directed to the UE in an allocated control region of a subframe. Without knowledge of the position, CCE aggregation level, or DCI format of its PDCCH, the UE searches for its PDCCH by monitoring a set of PDCCH candidates in the subframe in order to receive a control channel from the eNB. This is called blind decoding. Blind decoding is the process of demasking a CRC part with a UE ID, checking a CRC error, and determining whether a corresponding PDCCH is a control channel directed to a UE by the UE.

The UE monitors a PDCCH in every subframe to receive data transmitted to the UE in an active mode. In a Discontinuous Reception (DRX) mode, the UE wakes up in a monitoring interval of every DRX cycle and monitors a PDCCH in a subframe corresponding to the monitoring interval. The PDCCH-monitored subframe is called a non-DRX subframe.

To receive its PDCCH, the UE should blind-decode all CCEs of the control region of the non-DRX subframe. Without knowledge of a transmitted PDCCH format, the UE should decode all PDCCHs with all possible CCE aggregation levels until the UE succeeds in blind-decoding a PDCCH in every non-DRX subframe. Since the UE does not know the number of CCEs used for its PDCCH, the UE should attempt detection with all possible CCE aggregation levels until the UE succeeds in blind decoding of a PDCCH.

In the LTE system, the concept of Search Space (SS) is defined for blind decoding of a UE. An SS is a set of PDCCH candidates that a UE will monitor. The SS may have a different size for each PDCCH format. There are two types of SSs, Common Search Space (CSS) and UE-specific/Dedicated Search Space (USS).

While all UEs may know the size of a CSS, a USS may be configured for each individual UE. Accordingly, a UE should monitor both a CSS and a USS to decode a PDCCH. As a consequence, the UE performs up to 44 blind decodings in one subframe, except for blind decodings based on different CRC values (e.g., C-RNTI, P-RNTI, SI-RNTI, and RA-RNTI).

In view of the constraints of an SS, the eNB may not secure CCE resources to transmit PDCCHs to all intended UEs in a given subframe. This situation occurs because the remaining resources except for allocated CCEs may not be included in an SS for a specific UE. To minimize this obstacle that may continue in the next subframe, a UE-specific hopping sequence may apply to the starting point of a USS.

[Table 4] illustrates the sizes of CSSs and USSs.

TABLE 4

| PDCCH Format | Number of CCE (n) | Number of candidates in CSS | Number of candidates in USS |
|---|---|---|---|
| 0 | 1 | — | 6 |
| 1 | 2 | — | 6 |
| 2 | 4 | 4 | 2 |
| 3 | 8 | 2 | 2 |

To mitigate the load of the UE caused by the number of blind decoding attempts, the UE does not search for all defined DCI formats simultaneously. Specifically, the UE always searches for DCI Format 0 and DCI Format 1A in a USS. Although DCI Format 0 and DCI Format 1A are of the same size, the UE may distinguish the DCI formats by a flag for format0/format 1a differentiation included in a PDCCH. Other DCI formats than DCI Format 0 and DCI Format 1A, such as DCI Format 1, DCI Format 1B, and DCI Format 2 may be required for the UE.

The UE may search for DCI Format 1A and DCI Format 1C in a CSS. The UE may also be configured to search for DCI Format 3 or 3A in the CSS. Although DCI Format 3 and DCI Format 3A have the same size as DCI Format 0 and DCI Format 1A, the UE may distinguish the DCI formats by a CRC scrambled with an ID other than a UE-specific ID.

An SS $S_k^{(L)}$ is a PDCCH candidate set with a CCE aggregation level $L \in \{1, 2, 4, 8\}$. The CCEs of PDCCH candidate set m in the SS may be determined by the following equation.

$$L \cdot \{(Y_k+m) \bmod \lfloor N_{CCE,k}/L \rfloor\}+i \qquad \text{[Equation 1]}$$

Herein, $M^{(L)}$ is the number of PDCCH candidates with CCE aggregation level L to be monitored in the SS, m=0, Λ, $M^{(L)}-1$, i is the index of a CCE in each PDCCH candidate, and i=0, Λ, L−1. $k=\lfloor n_s/2 \rfloor$ where $n_s$ is the index of a slot in a radio frame.

As described before, the UE monitors both the USS and the CSS to decode a PDCCH. The CSS supports PDCCHs with CCE aggregation levels {4, 8} and the USS supports PDCCHs with CCE aggregation levels {1, 2, 4, 8}. [Table 5] illustrates PDCCH candidates monitored by a UE.

TABLE 5

| | Search space $S_k^{(L)}$ | | Number of PDCCH |
|---|---|---|---|
| Type | Aggregation level L | Size [in CCEs] | candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

Referring to [Equation 1], for two aggregation levels, L=4 and L=8, $Y_k$ is set to 0 in the CSS, whereas $Y_k$ is defined by [Equation 2] for aggregation level L in the USS.

$$Y_k=(A \cdot Y_{k-1}) \bmod D \qquad \text{[Equation 2]}$$

Herein, $Y_{-1}=n_{RNTI} \neq 0$, $n_{RNTI}$ indicating an RNTI value. A=39827 and D=65537.

1.3 Carrier Aggregation (CA) Environment 1.3.1 CA Overview

A 3GPP LTE system (conforming to Rel-8 or Rel-9) (hereinafter, referred to as an LTE system) uses Multi-Carrier Modulation (MCM) in which a single Component Carrier (CC) is divided into a plurality of bands. In contrast, a 3GPP LTE-A system (hereinafter, referred to an LTE-A system) may use CA by aggregating one or more CCs to support a broader system bandwidth than the LTE system. The term CA is interchangeably used with carrier combining, multi-CC environment, or multi-carrier environment.

In the present disclosure, multi-carrier means CA (or carrier combining). Herein, CA covers aggregation of contiguous carriers and aggregation of non-contiguous carriers. The number of aggregated CCs may be different for a DL and a UL. If the number of DL CCs is equal to the number of UL CCs, this is called symmetric aggregation. If the number of DL CCs is different from the number of UL CCs, this is called asymmetric aggregation. The term CA is interchangeable with carrier combining, bandwidth aggregation, spectrum aggregation, etc.

The LTE-A system aims to support a bandwidth of up to 100 MHz by aggregating two or more CCs, that is, by CA. To guarantee backward compatibility with a legacy IMT system, each of one or more carriers, which has a smaller bandwidth than a target bandwidth, may be limited to a bandwidth used in the legacy system.

For example, the legacy 3GPP LTE system supports bandwidths {1.4, 3, 5, 10, 15, and 20 MHz} and the 3GPP LTE-A system may support a broader bandwidth than 20 MHz using these LTE bandwidths. A CA system of the present disclosure may support CA by defining a new bandwidth irrespective of the bandwidths used in the legacy system.

There are two types of CA, intra-band CA and inter-band CA. Intra-band CA means that a plurality of DL CCs and/or UL CCs are successive or adjacent in frequency. In other words, the carrier frequencies of the DL CCs and/or UL CCs are positioned in the same band. On the other hand, an environment where CCs are far away from each other in frequency may be called inter-band CA. In other words, the carrier frequencies of a plurality of DL CCs and/or UL CCs are positioned in different bands. In this case, a UE may use a plurality of Radio Frequency (RF) ends to conduct communication in a CA environment.

The LTE-A system adopts the concept of cell to manage radio resources. The above-described CA environment may be referred to as a multi-cell environment. A cell is defined as a pair of DL and UL CCs, although the UL resources are not mandatory. Accordingly, a cell may be configured with DL resources alone or DL and UL resources.

For example, if one serving cell is configured for a specific UE, the UE may have one DL CC and one UL CC. If two or more serving cells are configured for the UE, the UE may have as many DL CCs as the number of the serving cells and as many UL CCs as or fewer UL CCs than the number of the serving cells, or vice versa. That is, if a plurality of serving cells are configured for the UE, a CA environment using more UL CCs than DL CCs may also be supported.

CA may be regarded as aggregation of two or more cells having different carrier frequencies (center frequencies). Herein, the term 'cell' should be distinguished from 'cell' as a geographical area covered by an eNB. Hereinafter, intra-band CA is referred to as intra-band multi-cell and inter-band CA is referred to as inter-band multi-cell.

In the LTE-A system, a Primacy Cell (PCell) and a Secondary Cell (SCell) are defined. A PCell and an SCell may be used as serving cells. For a UE in RRC_CONNECTED state, if CA is not configured for the UE or the UE does not support CA, a single serving cell including only a PCell exists for the UE. On the contrary, if the UE is in RRC_CONNECTED state and CA is configured for the UE, one or more serving cells may exist for the UE, including a PCell and one or more SCells.

Serving cells (PCell and SCell) may be configured by an RRC parameter. A physical-layer ID of a cell, PhysCellId is an integer value ranging from 0 to 503. A short ID of an SCell, SCellIndex is an integer value ranging from 1 to 7. A short ID of a serving cell (PCell or SCell), ServeCellIndex is an integer value ranging from 1 to 7. If ServeCellIndex is 0, this indicates a PCell and the values of ServeCellIndex for SCells are pre-assigned. That is, the smallest cell ID (or cell index) of ServeCellIndex indicates a PCell.

A PCell refers to a cell operating in a primary frequency (or a primary CC). A UE may use a PCell for initial connection establishment or connection reestablishment. The PCell may be a cell indicated during handover. In addition, the PCell is a cell responsible for control-related communication among serving cells configured in a CA environment. That is, PUCCH allocation and transmission for the UE may take place only in the PCell. In addition, the UE may use only the PCell in acquiring system information or changing a monitoring procedure. An Evolved Universal Terrestrial Radio Access Network (E-UTRAN) may change only a PCell for a handover procedure by a higher-layer RRCConnectionReconfiguraiton message including mobilityControlInfo to a UE supporting CA.

An SCell may refer to a cell operating in a secondary frequency (or a secondary CC). Although only one PCell is allocated to a specific UE, one or more SCells may be allocated to the UE. An SCell may be configured after RRC connection establishment and may be used to provide additional radio resources. There is no PUCCH in cells other than a PCell, that is, in SCells among serving cells configured in the CA environment.

When the E-UTRAN adds an SCell to a UE supporting CA, the E-UTRAN may transmit all system information related to operations of related cells in RRC_CONNECTED state to the UE by dedicated signaling. Changing system information may be controlled by releasing and adding a related SCell. Herein, a higher-layer RRCConnectionReconfiguration message may be used. The E-UTRAN may transmit a dedicated signal having a different parameter for each cell rather than it broadcasts in a related SCell.

After an initial security activation procedure starts, the E-UTRAN may configure a network including one or more SCells by adding the SCells to a PCell initially configured during a connection establishment procedure. In the CA environment, each of a PCell and an SCell may operate as a CC. Hereinbelow, a Primary CC (PCC) and a PCell may be used in the same meaning and a Secondary CC (SCC) and an SCell may be used in the same meaning in embodiments of the present disclosure.

Figure 6:
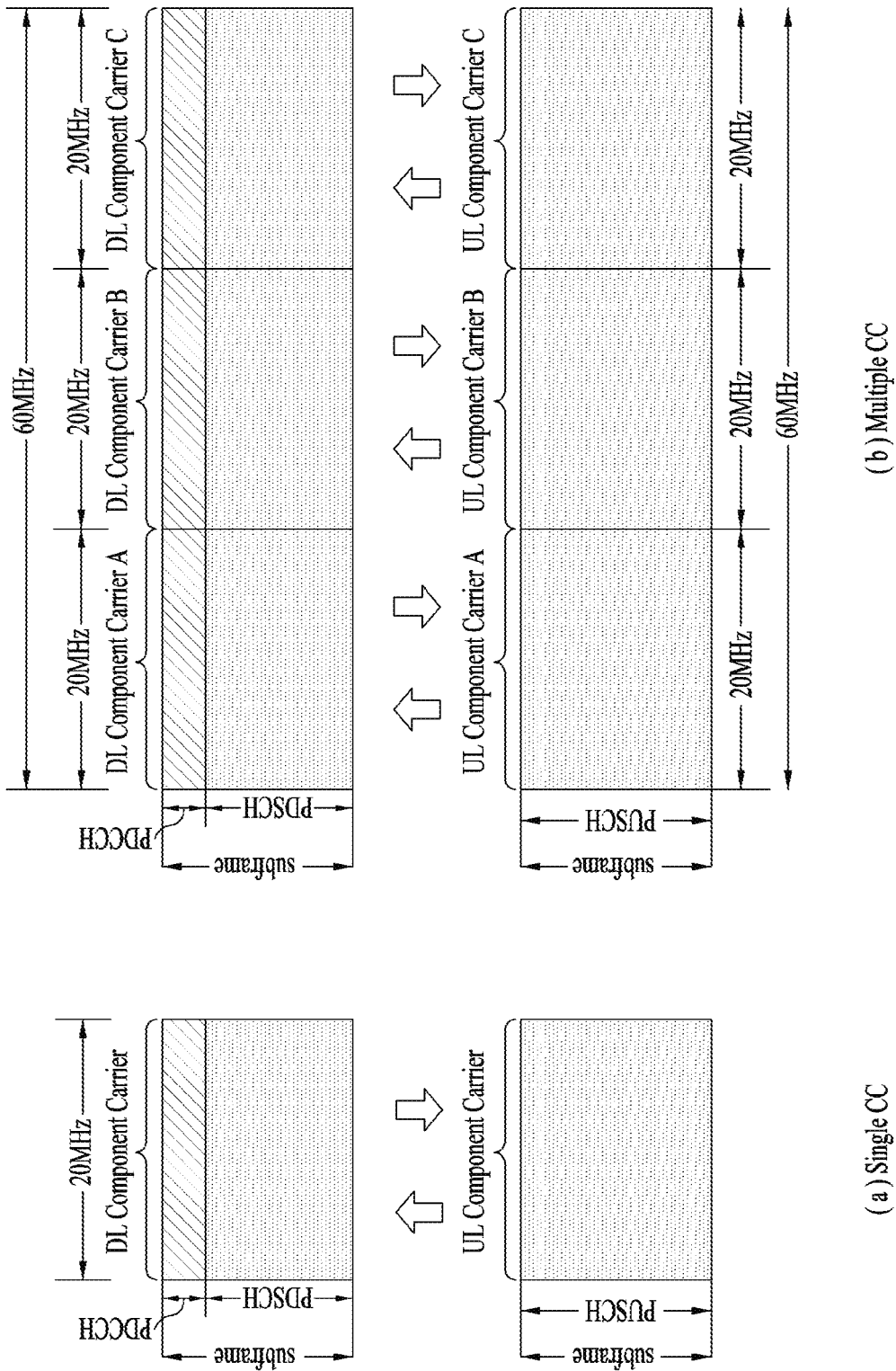
FIG. 6 is a view illustrating an example of Component Carriers (CCs) and Carrier Aggregation (CA) in a Long Term Evolution-Advanced (LTE-A) system.

FIG. 6 illustrates an example of CCs and CA in the LTE-A system, which are used in embodiments of the present disclosure.

FIG. 6(a) illustrates a single carrier structure in the LTE system. There are a DL CC and a UL CC and one CC may have a frequency range of 20 MHz.

FIG. 6(b) illustrates a CA structure in the LTE-A system. In the illustrated case of FIG. 6(b), three CCs each having 20 MHz are aggregated. While three DL CCs and three UL CCs are configured, the numbers of DL CCs and UL CCs are not limited. In CA, a UE may monitor three CCs simultaneously, receive a DL signal/DL data in the three CCs, and transmit a UL signal/UL data in the three CCs.

If a specific cell manages N DL CCs, the network may allocate M (M≤N) DL CCs to a UE. The UE may monitor only the M DL CCs and receive a DL signal in the M DL CCs. The network may prioritize L (L≤M≤N) DL CCs and allocate a main DL CC to the UE. In this case, the UE should monitor the L DL CCs. The same thing may apply to UL transmission.

The linkage between the carrier frequencies of DL resources (or DL CCs) and the carrier frequencies of UL resources (or UL CCs) may be indicated by a higher-layer message such as an RRC message or by system information. For example, a set of DL resources and UL resources may be configured based on linkage indicated by System Information Block Type 2 (SIB2). Specifically, DL-UL linkage may refer to a mapping relationship between a DL CC carrying a PDCCH with a UL grant and a UL CC using the UL grant, or a mapping relationship between a DL CC (or a UL CC) carrying HARQ data and a UL CC (or a DL CC) carrying an HARQ ACK/NACK signal.

1.3.2 Cross Carrier Scheduling

Two scheduling schemes, self-scheduling and cross carrier scheduling are defined for a CA system, from the perspective of carriers or serving cells. Cross carrier scheduling may be called cross CC scheduling or cross cell scheduling.

In self-scheduling, a PDCCH (carrying a DL grant) and a PDSCH are transmitted in the same DL CC or a PUSCH is transmitted in a UL CC linked to a DL CC in which a PDCCH (carrying a UL grant) is received.

In cross carrier scheduling, a PDCCH (carrying a DL grant) and a PDSCH are transmitted in different DL CCs or a PUSCH is transmitted in a UL CC other than a UL CC linked to a DL CC in which a PDCCH (carrying a UL grant) is received.

Cross carrier scheduling may be activated or deactivated UE-specifically and indicated to each UE semi-statically by higher-layer signaling (e.g. RRC signaling).

If cross carrier scheduling is activated, a Carrier Indicator Field (CIF) is required in a PDCCH to indicate a DL/UL CC in which a PDSCH/PUSCH indicated by the PDCCH is to be transmitted. For example, the PDCCH may allocate PDSCH resources or PUSCH resources to one of a plurality of CCs by the CIF. That is, when a PDCCH of a DL CC allocates PDSCH or PUSCH resources to one of aggregated DL/UL CCs, a CIF is set in the PDCCH. In this case, the DCI formats of LTE Release-8 may be extended according to the CIF. The CIF may be fixed to three bits and the position of the CIF may be fixed irrespective of a DCI format size. In addition, the LTE Release-8 PDCCH structure (the same coding and resource mapping based on the same CCEs) may be reused.

On the other hand, if a PDCCH transmitted in a DL CC allocates PDSCH resources of the same DL CC or allocates PUSCH resources in a single UL CC linked to the DL CC, a CIF is not set in the PDCCH. In this case, the LTE Release-8 PDCCH structure (the same coding and resource mapping based on the same CCEs) may be used.

If cross carrier scheduling is available, a UE needs to monitor a plurality of PDCCHs for DCI in the control region of a monitoring CC according to the transmission mode and/or bandwidth of each CC. Accordingly, an appropriate SS configuration and PDCCH monitoring are needed for the purpose.

In the CA system, a UE DL CC set is a set of DL CCs scheduled for a UE to receive a PDSCH, and a UE UL CC set is a set of UL CCs scheduled for a UE to transmit a PUSCH. A PDCCH monitoring set is a set of one or more DL CCs in which a PDCCH is monitored. The PDCCH monitoring set may be identical to the UE DL CC set or may be a subset of the UE DL CC set. The PDCCH monitoring set may include at least one of the DL CCs of the UE DL CC set. Or the PDCCH monitoring set may be defined irrespective of the UE DL CC set. DL CCs included in the PDCCH monitoring set may be configured to always enable self-scheduling for UL CCs linked to the DL CCs. The UE DL CC set, the UE UL CC set, and the PDCCH monitoring set may be configured UE-specifically, UE group-specifically, or cell-specifically.

If cross carrier scheduling is deactivated, this implies that the PDCCH monitoring set is always identical to the UE DL CC set. In this case, there is no need for signaling the PDCCH monitoring set. However, if cross carrier scheduling is activated, the PDCCH monitoring set may be defined within the UE DL CC set. That is, the eNB transmits a PDCCH only in the PDCCH monitoring set to schedule a PDSCH or PUSCH for the UE.

Figure 7:
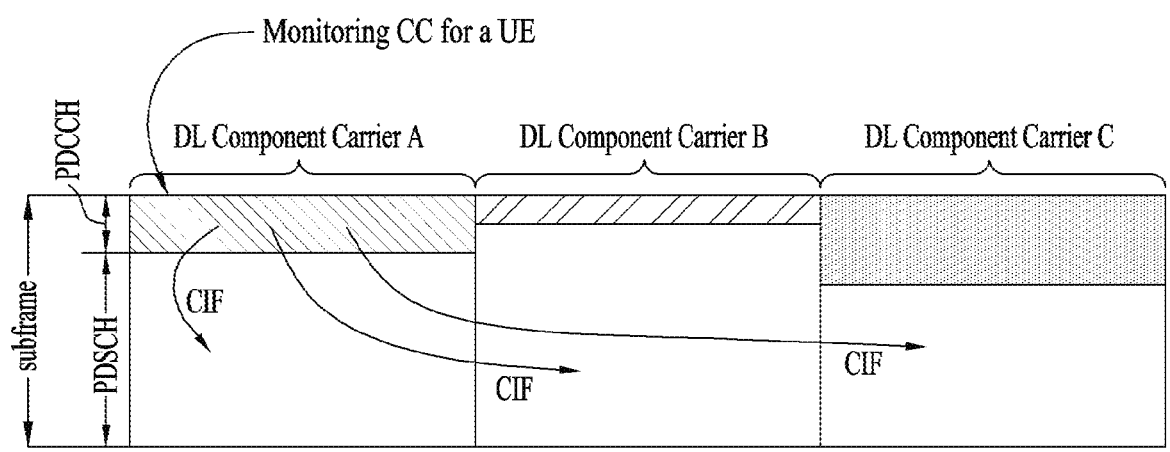
FIG. 7 is a view illustrating a subframe structure based on cross-carrier scheduling in the LTE-A system.

FIG. 7 illustrates a cross carrier-scheduled subframe structure in the LTE-A system, which is used in embodiments of the present disclosure.

Referring to FIG. 7, three DL CCs are aggregated for a DL subframe for LTE-A UEs. DL CC 'A' is configured as a PDCCH monitoring DL CC. If a CIF is not used, each DL CC may deliver a PDCCH that schedules a PDSCH in the same DL CC without a CIF. On the other hand, if the CIF is used by higher-layer signaling, only DL CC 'A' may carry a PDCCH that schedules a PDSCH in the same DL CC 'A' or another CC. Herein, no PDCCH is transmitted in DL CC 'B' and DL CC 'C' that are not configured as PDCCH monitoring DL CCs.

1.3.3 CA Environment-Based CoMP Operation

Hereinafter, a cooperation multi-point (CoMP) transmission operation applicable to the embodiments of the present disclosure will be described.

In the LTE-A system, CoMP transmission may be implemented using a carrier aggregation (CA) function in the LTE. FIG. 8 is a conceptual view illustrating a CoMP system operating based on a CA environment.

In FIG. 8, it is assumed that a carrier operated as a PCell and a carrier operated as an SCell may use the same frequency band on a frequency axis and are allocated to two eNBs geographically spaced apart from each other. At this time, a serving eNB of UE1 may be allocated to the PCell, and a neighboring cell causing much interference may be allocated to the SCell. That is, the eNB of the PCell and the eNB of the SCell may perform various DL/UL CoMP operations such as joint transmission (JT), CS/CB and dynamic cell selection for one UE.

FIG. 8 illustrates an example that cells managed by two eNBs are aggregated as PCell and SCell with respect to one UE (e.g., UE1). However, as another example, three or more cells may be aggregated. For example, some cells of three or more cells may be configured to perform CoMP operation for one UE in the same frequency band, and the other cells may be configured to perform simple CA operation in different frequency bands. At this time, the PCell does not always need to participate in CoMP operation.

1.4 System Information Block (SIB)

SIBs are used for an eNB to transmit system information. That is, a UE may acquire system information by receiving different SIBs from the eNB. The SIBs are transmitted on a DL-SCH at the logical layer, and on a PDSCH at the physical layer. It is determined whether there is an SIB, by a PDCCH signal masked with a System Information Radio Network Temporary Identifier (SI-RNTI).

Among the SIBs, SIB type 1 (SIB1) includes parameters required to determine whether a corresponding cell is suitable for cell selection, and information about time-axis scheduling of other SIBs. SIB type 2 (SIB2) includes common channel information and shared channel information. SIB3 to SIB8 include cell reselection-related information, inter-frequency information, intra-frequency information, and so on. SIB9 is used to indicate the name of a Home eNode B (HeNB), and SIB10, SIB11, and SIB12 include an Earthquake and Tsunami Warning Service (ETWS) notification and a Commercial Mobile Alert System (CMAS) alert message. SIB13 includes Multimedia Broadcast Multicast Service (MBMS)-related control information.

Herein, SIB1 includes cell access-related parameters and scheduling information about other SIBs. SIB1 is transmitted every 80 ms, and a UE should be able to receive SIB1 in idle mode/connected mode. SIB1 is transmitted every 80 ms, and a UE should be able to receive SIB1 in idle mode/connected mode. Transmission of SIB1 starts in subframe #5 of a radio frame satisfying SFN mod 8=0 and proceeds in subframe #5 of a radio frame satisfying SFN mod 2=0. SIB1 is transmitted, including the following information.

TABLE 6

```
SystemInformationBlockType1 ::=    SEQUENCE {
       cellAccessRelatedInfo           SEQUENCE {
           plmn-IdentityList               PLMN-IdentityList,
           trackingAreaCode                TrackingAreaCode,
           cellIdentity                CellIdentity,
           cellBarred                      ENUMERATED {barred, notBarred},
           intraFreqReselection            ENUMERATED {allowed, notAllowed},
```

TABLE 6-continued

```
    csg-Indication              BOOLEAN,
    csg-Identity                CSG-Identity        OPTIONAL    -- Need OR
},
cellSelectionInfo              SEQUENCE {
    q-RxLevMin                     Q-RxLevMin,
    q-RxLevMinOffset               INTEGER (1..8)   OPTIONAL    -- Need OP
},
p-Max                          P-Max               OPTIONAL,   -- Need OP
freqBandIndicator              FreqBandIndicator,
schedulingInfoList             SchedulingInfoList,
tdd-Config                     TDD-Config          OPTIONAL,   -- Cond TDD
si-WindowLength                ENUMERATED {
                                   ms1, ms2, ms5, ms10, ms15, ms20,
                                   ms40},
systemInfoValueTag             INTEGER (0..31),
nonCriticalExtension           SystemInformationBlockType1-v890-IEs   OPTIONAL
}
SchedulingInfoList ::= SEQUENCE (SIZE (1..maxSI-Message)) OF SchedulingInfo
SchedulingInfo ::= SEQUENCE {
    si-Periodicity                 ENUMERATED {
                                       rf8, rf16, rf32, rf64, rf128, rf256, rf512},
    sib-MappingInfo                SIB-MappingInfo
}
SIB-MappingInfo ::= SEQUENCE (SIZE (0..maxSIB-1)) OF SIB-Type
SIB-Type ::=                   ENUMERATED {
                                   sibType3, sibType4, sibType5, sibType6,
                                   sibType7, sibType8, sibType9, sibType10,
                                   sibType11, sibType12-v920, sibType13-v920,
                                   sibType14-v1130, sibType15-v1130,
                                   sibType16-v1130, sibType17-v12xy, spare1, ...}
```

For a description of the parameters included in SIB1, as listed in [Table 6], refer to sub-clauses 5.2.2.7 and 6.2.2 of 3GPP TS 36.331.

SI messages may be transmitted within a time area (i.e., an SI window) generated periodically by dynamic scheduling. Each SI message is related to a specific SI window, and the specific SI windows do not overlap with other SI messages. A common SI window length may be set for all SI messages.

Within an SI window, a corresponding SI message is transmitted a plurality of times in all subframes except for MBSFN subframes, and UL subframes and subframes #5 of radio frames satisfying SFN mod 2=0 in TDD. A UE may acquire specific time-domain scheduling information from SI messages.

RVs are determined for a PDSCH scheduled by a PDCCH masked with an SI-RNTI in DCI format 1C, according to the following [Equation 3].

$$RV_K = \text{ceiling}(3/2 \ast k) \text{modulo } 4 \quad \text{[Equation 3]}$$

In [Equation 3], k is determined according to the type of an SI message. For example, k=(SFN/2) modulo 4 for an SIB1 message. Here, SFN represents a system frame number. For each piece of system information, k=i modulo 4 and i=0, 1, ..., $n_s^w - 1$ where i represents the number of a subframe within an SI window $n_s^w$.

1.5 Method for Transmitting Paging Message

A paging message is used to deliver paging information, SI message update information, a Public Warning System (PWS) message, or the like. A default paging cycle may be set for each cell and a dedicated paging cycle may be set for each UE, for transmission of a paging message. If two or more paging cycles are set for a UE, a minimum paging cycle becomes the paging cycle of the UE.

Paging subframes available for transmission of a paging message may be calculated by [Equation 4].

$$SFN \text{ mod } T = (T/N) \times (UE\_ID \text{ mod } N) \quad \text{[Equation 4]}$$

In embodiments of the present disclosure, i_s represents an index indicating a predefined table that defines paging subframes, and i_s=floor(UE_ID/N) mod $N_S$. In [Equation 4], T is the UE Discontinuous Reception (DRX) cycle of the UE and may be given as T=min($T_c, T_{UE}$) where $T_c$ is a cell-specific default paging cycle which may be set to {32, 64, 128, 256} radio frames, and $T_{UE}$ is a UE-specific paging cycle which may be set to {32, 64, 128, 256} radio frames. N represents the number of paging frames within one paging cycle, and may be given as N=min(T, nB) where nB is the number of paging subframes per paging cycle {4T, 2T, T, T/2, T/4, T/8, T/16, T/32}. $N_S$ represents the number of paging subframes in a radio frame used for paging and it is configured that $N_s$=max(1, nB/T).

[Table 7] and [Table 8] below illustrate paging subframe patterns in FDD and TDD, respectively.

TABLE 7

| Ns | PO when i_s = 0 | PO when i_s = 1 | PO when i_s = 2 | PO when i_s = 3 |
|---|---|---|---|---|
| 1 | 9 | N/A | N/A | N/A |
| 2 | 4 | 9 | N/A | N/A |
| 4 | 0 | 4 | 5 | 9 |

TABLE 8

| Ns | PO when i_s = 0 | PO when i_s = 1 | PO when i_s = 2 | PO when i_s = 3 |
|---|---|---|---|---|
| 1 | 0 | N/A | N/A | N/A |
| 2 | 0 | 5 | N/A | N/A |
| 4 | 0 | 1 | 5 | 6 |

[Table 9] illustrates exemplary paging subframes determined according to [Equation 4] and paging-related parameters.

TABLE 9

| Case | UE_ID | $T_c$ | $T_{UE}$ | T | nB | N | $N_s$ | PF | i_s | PO |
|------|-------|-------|----------|---|----|---|-------|----|----|----|
| A | 147 | 256 | 256 | 256 | 64 | 64 | 1 | 76 | 0 | 9 |
| B | 147 | 256 | 128 | 128 | 32 | 32 | 1 | 76 | 0 | 9 |
| C | 147 | 256 | 128 | 128 | 256 | 128 | 2 | 19 | 1 | 4 |

1.6 Reference Signal (RS)

Now, a description will be given of RSs that may be used in embodiments of the present disclosure.

Figure 9:
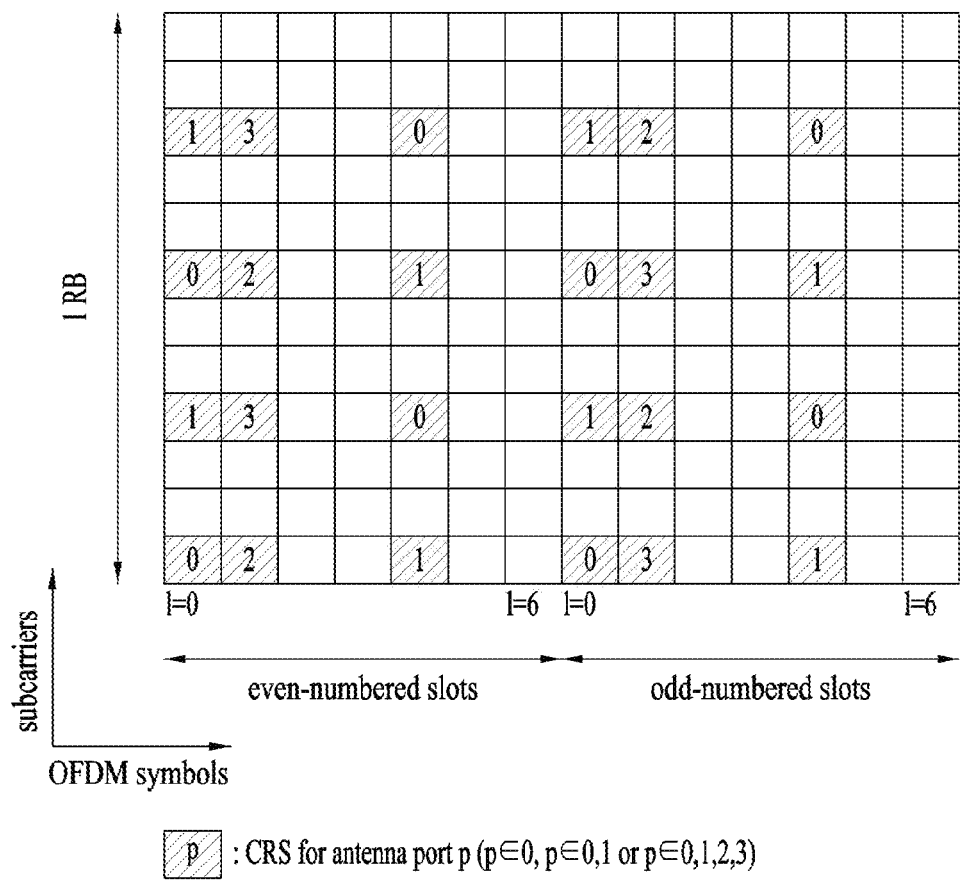
FIG. 9 is a view illustrating an exemplary subframe to which Cell-specific Reference Signals (CRSs) are allocated, which may be used in embodiments of the present disclosure.

FIG. 9 is a view illustrating an exemplary subframe in which Cell-specific Reference Signals (CRSs) are allocated, which may be used in embodiments of the present disclosure.

FIG. 9 illustrates a CRS allocation structure, when a system supports four antennas. CRS is used for the purpose of decoding and channel state measurement in the 3GPP LTE/LTE-A system. Therefore, CRSs are transmitted across a total DL bandwidth in every DL subframe in a cell supporting PDSCH transmission, and through all antenna ports configured for an eNB.

Specifically, a CRS sequence is mapped to complex-valued modulation symbols used as reference symbols for antenna port p in slot $n_s$.

A UE may measure CSI using CRSs and decode a DL data signal received on a PDSCH in a subframe including CRSs, using the CRSs. That is, the eNB transmits CRSs at predetermined positions in every RB, and the UE performs channel estimation based on the CRSs and then detects the PDSCH. For example, the UE measures signals received in CRS REs. The UE may detect a PDSCH signal in REs to which the PDSCH is mapped, based on the ratio between per-CRS RE reception energy and per-PDSCH RE reception energy.

If a PDSCH signal is transmitted based on CRSs in this manner, the eNB should transmit CRSs in all RBs, resulting in unnecessary RS overhead. To solve the problem, the 3GPP LTE-A system additionally defines UE-specific RS (hereinafter, referred to as UE-RS) and Channel State Information Reference Signal (CSI-RS) as well as CRS. UE-RS is used for demodulation, and CSI-RS is used for deriving CSI.

Since UE-RS and CRS are used for demodulation, they may be referred to as demodulation RS in terms of their usage. That is, UE-RS may be regarded as a kind of Demodulation Reference Signal (DM-RS). Further, since CSI-RS and CRS are used for channel measurement or channel estimation, they may be regarded as channel state measurement RS in terms of their usage.

Figure 10:
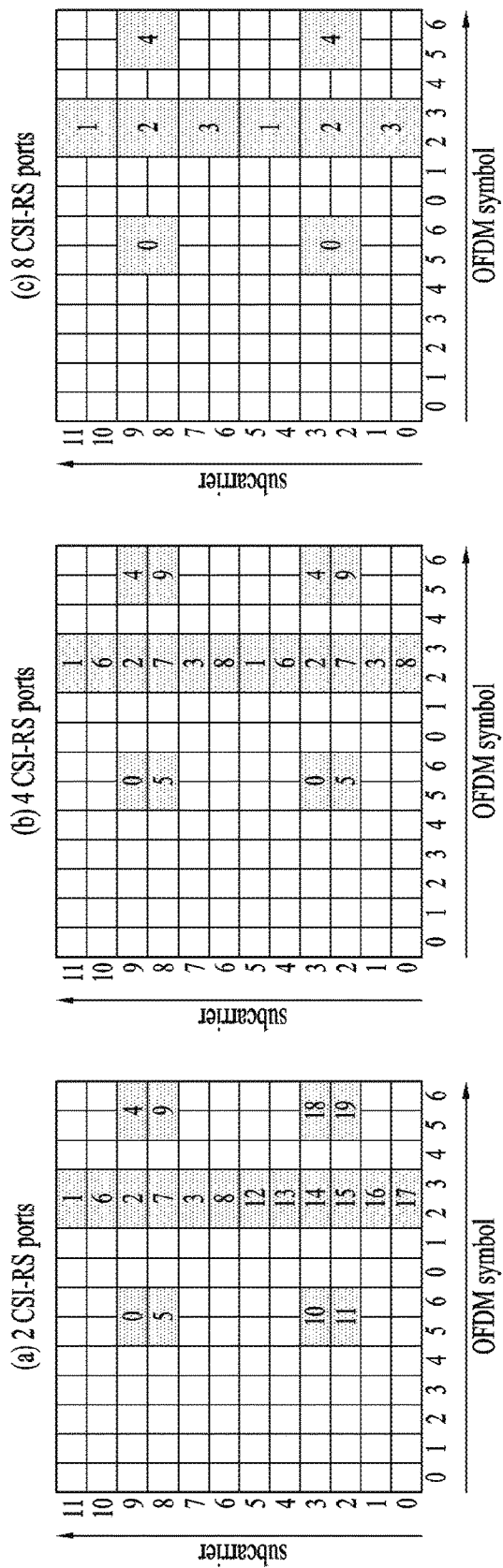
FIG. 10 is a view illustrating exemplary subframes to which Channel State Information Reference Signals (CSI-RSs) are allocated according to numbers of antenna ports, which may be used in embodiments of the present disclosure.

FIG. 10 is a view illustrating exemplary subframes in which CSI-RSs are allocated according to numbers of antenna ports, which may be used in embodiments of the present disclosure.

CSI-RS is a DL RS which has been introduced to the 3GPP LTE-A system, for the purpose of radio channel state measurement, not demodulation. The 3GPP LTE-A system defines a plurality of CSI-RS configurations for CSI-RS transmission. A CSI-RS sequence is mapped to complex-valued modulation symbols used as reference symbols for antenna port p in subframes for which CSI-RS transmission is configured.

FIG. 10(a) illustrates 20 CSI-RS configurations, CSI-RS configuration 0 to CSI-RS configuration 19 available for CSI-RS transmission through 2 CSI ports, among CSI-RS configuration, FIG. 10(b) illustrates 10 CSI-RS configurations, CSI-RS configuration 0 to CSI-RS configuration 9 available for CSI-RS transmission through 4 CSI ports, among the CSI-RS configurations, and FIG. 10(c) illustrates 5 CSI-RS configurations, CSI-RS configuration 0 to CSI-RS configuration 4 available for CSI-RS transmission through 8 CSI ports, among the CSI-RS configurations.

Herein, a CSI-RS port refers to an antenna port configured for CSI-RS transmission. A different CSI-RS configuration is used according to the number of CSI-RS ports. Therefore, in spite of the same CSI-RS configuration number, the CSI-RS configuration is different for a different number of antenna ports configured for CSI-RS transmission.

Compared to CRSs configured to be transmitted in every subframe, CSI-RSs are configured to be transmitted in every predetermined transmission period corresponding to a plurality of subframes. Accordingly, the CSI-RS configuration differs according to a subframe for which CSI-RSs are configured as well as the positions of REs occupied by CSI-RSs in an RB pair.

Despite the same CSI-RS configuration number, the CSI-RS configuration may be considered to be different in a different subframe for CSI-RS transmission. For example, if ae CSI-RS transmission period $T_{CSI-RS}$ is different or a starting subframe $\Delta_{CSI-RS}$ in which CSI-RS transmission is configured in a radio frame is different, the CSI-RS configuration may be considered to be different.

In order to distinguish (1) a CSI-RS configuration to which a CSI-RS configuration number is assigned from (2) a CSI-RS configuration which varies according to a CSI-RS configuration number, the number of CSI-RS ports, and/or a subframe for which CSI-RSs are configured, the latter CSI-RS configuration (2) will be referred to as a CSI-RS resource configuration, and the former CSI-RS configuration (1) will be referred to as a CSI-RS configuration or a CSI-RS pattern.

When the eNB indicates a CSI-RS resource configuration to a UE, the eNB may transmit to the UE information about the number of antenna ports used for transmission of CSI-RSs, a CSI-RS pattern, a CSI-RS subframe configuration $I_{CSI-RS}$, a UE assumption on reference PDSCH transmission power for CSI feedback, $P_c$, a Zero Power (ZP) CSI-RS configuration list, a ZP CSI-RS subframe configuration, and so on.

The index of a CSI-RS subframe configuration, $I_{CSI-RS}$ is Information that specifies a subframe configuration periodicity $T_{CSI-RS}$ for occurrence of CSI-RSs, and a subframe offset $\Delta_{CSI-RS}$. [Table 10] below lists exemplary CSI-RS subframe configuration indexes, $I_{CSI-RS}$ according to $T_{CSI-RS}$ and $\Delta_{CSI-RS}$.

TABLE 10

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS} - 5$ |
| 15-34 | 20 | $I_{CSI-RS} - 15$ |
| 35-74 | 40 | $I_{CSI-RS} - 35$ |
| 75-154 | 80 | $I_{CSI-RS} - 75$ |

Subframes satisfying [Equation 5] are CSI-RS subframes.

$$(10n_f + \lfloor n_s/2 \rfloor - \Delta_{CSI-RS}) \bmod T_{CSI-RS} = 0 \quad \text{[Equation 5]}$$

A UE for which a Transmission Mode (TM) defined beyond 3GPP LTE-A (e.g., TM9 or a newly defined TM) has been configured may perform channel measurement using CSI-RSs, and decode a PDSCH using UE-RSs.

A UE for which a Transmission Mode (TM) defined beyond 3GPP LTE-A (e.g., TM9 or a newly defined TM) has been configured may perform channel measurement using CSI-RSs, and decode a PDSCH using UE-RSs.

1.7 Enhanced PDCCH (EPDCCH)

In Cross-Carrier Scheduling (CCS) under a situation in which a plurality of Components Carriers (CCs=(serving) cells) are aggregated in the 3GPP LTE/LTE-A system, one scheduled CC may be pre-configured to be DL/UL-scheduled only by one other scheduling CC (i.e., so that a DL/UL grant PDCCH for the scheduled CC may be received). Basically, the scheduling CC may perform DL/UL scheduling for itself. In other words, a Search Space (SS) for a PDCCH that schedules a scheduling/scheduled CC in the CCS relationship may exist in the control channel region of every scheduling CC.

Meanwhile, the LTE system allocates the first n (n<=4) OFDM symbols of each subframe to transmission of physical channels, PDCCH, PHICH, and PCFICH carrying control information and allocates the other OFDM symbols of the subframe to PDSCH transmission in an FDD DL carrier or TDD DL subframes. The number of OFDM symbols used for transmission of control channels in each subframe may be indicated to UEs, dynamically on a physical channel such as the PCFICH or semi-statically by RRC signaling.

Figure 11:
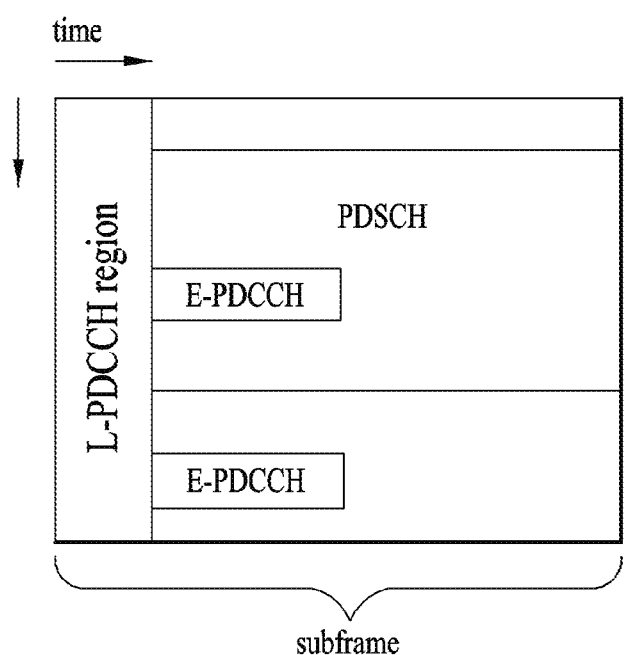
FIG. 11 is a view illustrating exemplary multiplexing of a legacy Physical Downlink Control Channel (PDCCH), a Physical Downlink Shared Channel (PDSCH), and an Enhanced PDCCH (EPDCCH) in an LTE/LTE-A system.

A physical channel used for DL/UL scheduling and transmission of various types of control information, PDCCH has limitations such as transmission in limited OFDM symbols in the LTE/LTE-A system. Therefore, an extended PDCCH (i.e., EPDCCH) multiplexed more freely with a PDSCH in Frequency Division Multiplexing (FDM)/Time Division Multiplexing (TDM) may be introduced, instead of a control channel such as the PDCCH transmitted in OFDM symbols separate from PDSCH symbols. FIG. 11 is a view illustrating exemplary multiplexing of the legacy PDCCH, the PDSCH, and the EPDCCH in the LTE/LTE-A system.

1.8 Synchronization Signal

A Synchronization Signal (SS) includes a Primary Synchronization Signal (PSS) and a Secondary Synchronization Signal (SSS). The SS is a signal used for establishing synchronization between a UE and an eNB and performing cell search.

Figure 12:
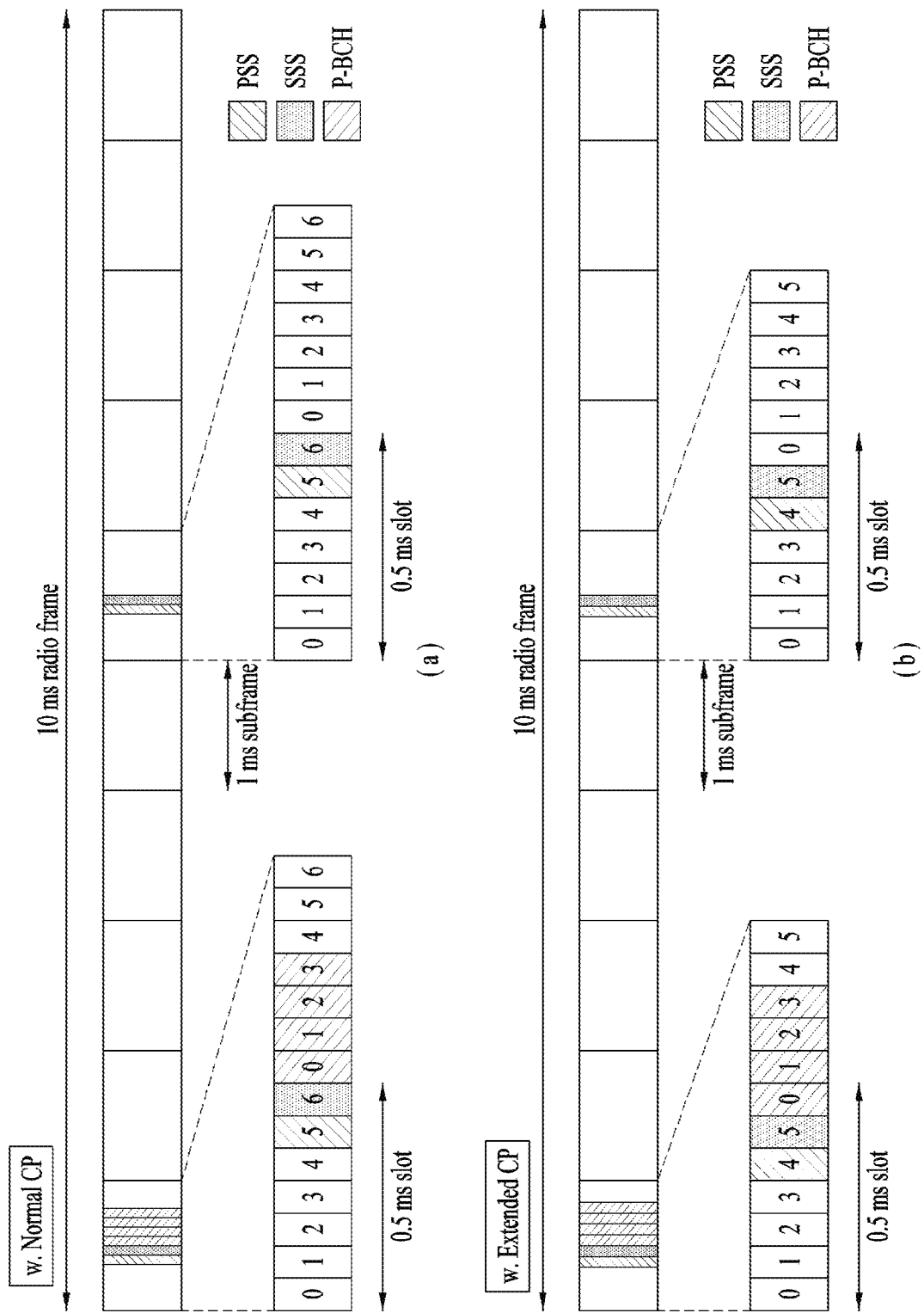
FIG. 12 is a view illustrating an exemplary frame structure showing a position for transmitting a synchronization signal.

FIG. 12 is a view illustrating an exemplary frame structure showing a position for transmitting a synchronization signal. In particular, FIG. 12(*a*) shows a frame structure for SS transmission in a system using a Cyclic Prefix (CP), and FIG. 12 (*b*) shows a frame structure for SS transmission in a system using an extended CP.

The SS is transmitted in a second slot in each of subframe 0 and subframe 5 in consideration of a GSM frame length of 4.6 ms for facilitation of inter-Radio Access Technology (inter-RAT) measurement. In this case, boundaries of a corresponding radio frame may be detected through the SSS.

Referring to FIG. 12(*a*) and FIG. 12(*b*), the PSS is transmitted in the last OFDM symbol of each of slot 0 and slot 5, and the SSS is transmitted in an OFDM symbol immediately before the OFDM symbol in which the PSS is transmitted. The SS can carry total 504 physical layer cell IDs (physical cell IDs) through combinations of 3 PSSs and 168 SSSs. In addition, the SS and a PBCH are transmitted within 6 RBs in the middle of the system bandwidth, and thus a UE can detect or decode the SS and PBCH irrespective of a transmission bandwidth size.

A transmission diversity scheme for the SS uses a single antenna port only. That is, a single antenna transmission scheme or a transmission scheme transparent to a UE (e.g., PVS, TSTD, CDD, etc.) may be used.

1.8.1 Primary Synchronization Signal (PSS)

A Zadoff-Chu (ZC) sequence of length 63 is defined in the frequency domain and the sequence is used as a sequence for the PSS. The ZC sequence can be defined according to Equation 6.

$$d_u(n) = e^{-j\frac{\pi u n(n+1)}{N_{ZC}}}$$ [Equation 6]

In Equation 6, $N_{ZC}$ indicates the length of the ZC sequence, 63 and du(n) indicates the PSS sequence in accordance with a root index, u. In this case, a sequence element corresponding to a Direct Current (DC) subcarrier, n=31 is punctured.

In order to facilitate designing a filter for performing synchronization, 9 remaining subcarriers among 6 RBs (i.e., 72 subcarriers) in the middle of the bandwidth are always set to 0 and then transmitted. To define total 3 PSSs, u may have the values of 25, 29 and 34 in Equation 2 (i.e., u=25, 29 and 34). In this case, since u=29 and u=34 are in a conjugate symmetry relation, two correlations may be simultaneously performed. Here, the conjugate symmetry means a relation in Equation 3 below. A one-shot correlator for u=29 and u=34 can be implemented using conjugate symmetry characteristics, and the total amount of calculation can be reduced by about 33.3%.

$$d_u(n) = (-1^n(d_{N_{ZC}-u}(n))^*, \text{ when } N_{ZC} \text{ is even number.}$$

$$d_u(n) = (d_{N_{ZC}-u}(n))^*, \text{ when } N_{ZC} \text{ is odd number.}$$ [Equation 7]

1.8.2 Secondary Synchronization Signal (SSS)

The SSS is generated by interleaving and concatenating two m-sequences each of length 31. In this case, 168 cell group IDs can be distinguished by combining the two sequences. As a sequence for the SSS, the m-sequence has a robust property in a frequency-selective environment. In addition, the amount of calculation can be reduced by applying high-speed m-sequence transformation using Fast Hadamard Transform. Moreover, to reduce the amount of calculation of a UE, it is proposed that the SSS is composed of two short codes.

Figure 13:
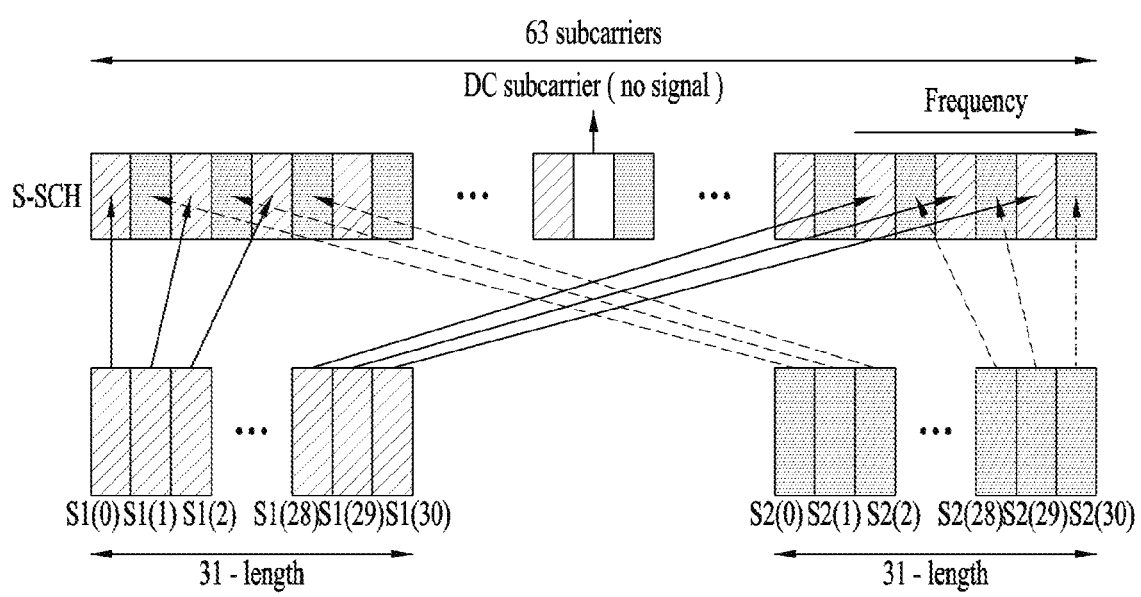
FIG. 13 is a view illustrating a method for generating a secondary synchronization signal.

FIG. 13 is a view illustrating a method for generating a secondary synchronization signal.

Referring to FIG. 13, it can be seen that two sequences defined in the logical domain are interleaved and mapped in the physical domain. For example, two m-sequences used for generating an SSS code may be respectively defined as S1 and S2. In this case, if an SSS in subframe index 0 carries a cell group ID through a combination of (S1, S2) and an SSS in subframe index 5 is transmitted by being swapped as (S2, S1), it is possible to distinguish between boundaries of a 10 ms frame. In this case, a generation polynomial of $x^5+x^2+1$ may be used for the SSS code, and total 31 codes may be generated through different circular shifts.

In order to improve reception performance, two different PSS-based sequences are defined and scrambled into the SSS. In this case, scrambling may be performed on S1 and S2 using different sequences. Thereafter, an S1-based scrambling code is defined, and then scrambling is performed on S2. In this case, the SSS code is swapped every 5 ms but a PSS-based scrambling code is not swapped. The PSS-based scrambling code is defined based on an m-sequence generated from the generation polynomial of $x^5+x^2+1$ by applying six cyclic shift schemes according to PSS indices, and S1-based scrambling code is defined based on an m-sequence generated from a polynomial of $x^5+x^4+x^2+x^1+1$ as eight cyclic shift versions according to S1 indices.

2. Narrowband Internet of Things (NB-IoT)

2.1 NB-IoT Overview

The Narrowband (NB) LTE is a system for supporting low complexity and power consumption using a system bandwidth corresponding to 1 PRB, which is defined in the LTE system. As a communication scheme, the NB LTE can be used to implement Internet of Things (IoT) by supporting devices in a cellular system like Machine-Type Communication (MTC). That is, the NB LTE system can be referred to as an NB-IoT system.

Since the NB-IoT system use the same OFDM parameters including subcarrier spacing as in the LTE system, 1 PRB in the legacy LTE band is allocated for the NB-LTE without additional allocation of bands. That is, the NB-IoT system has advantages in that frequencies can be efficiently used.

In the NB-LTE system, physical downlink channels are defined as an M-PSS/M-SSS, an M-PBCH, an M-PDCCH/M-EPDCCH, an M-PDSCH, etc. or an NB-PSS/NB-SSS, an NB-PBCH, an NB-PDCCH/NB-EPDDCH, an NB-PDSCH, etc. To distinguish the physical downlink channels of the NB-LTE system from physical channels of the LTE system, 'M-' or 'NB-' can be added.

Figure 14:
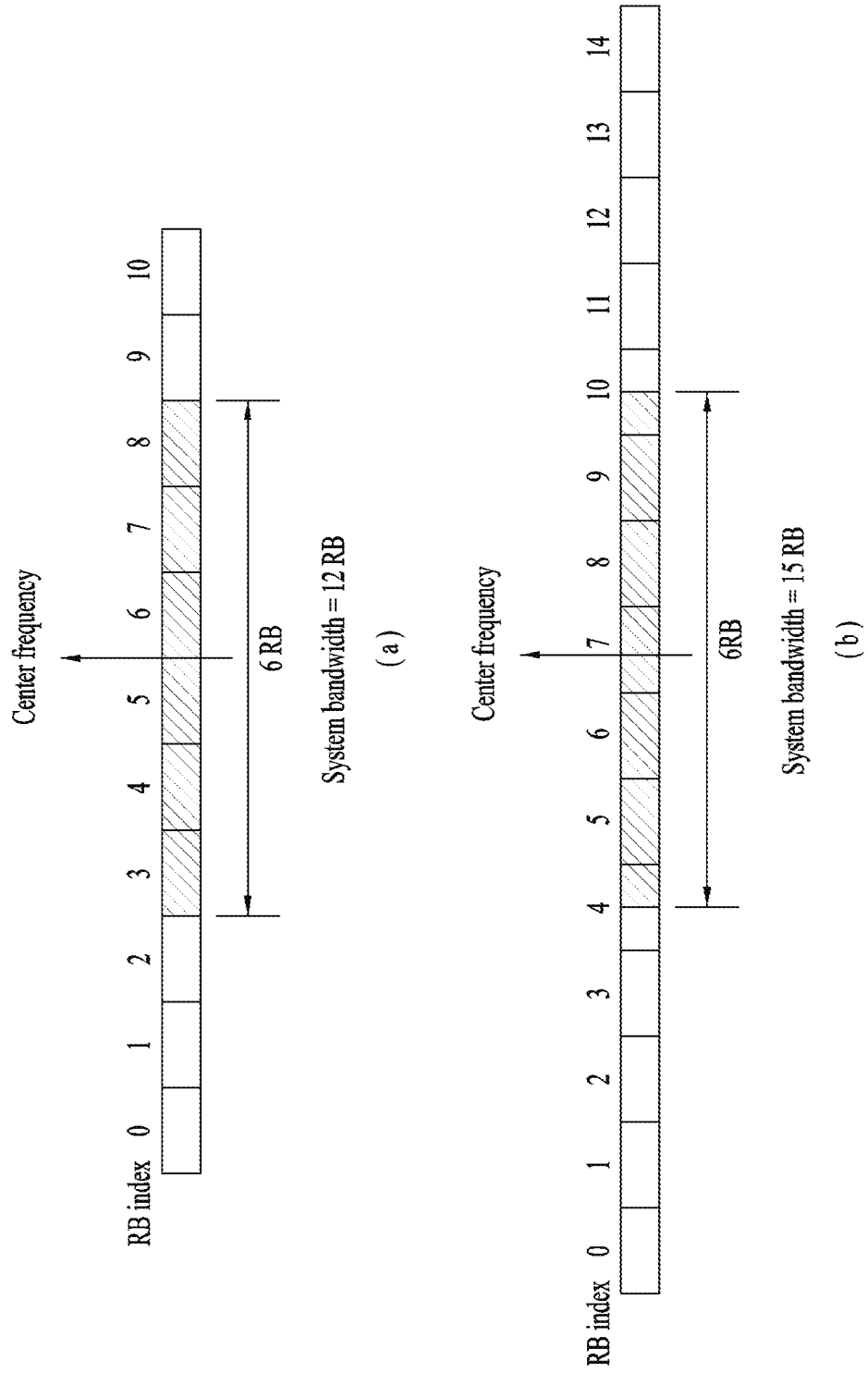
FIG. 14 is a view for explaining a PRB set capable of transmitting a PSS/SSS and a PBCH according to the number of PRBs corresponding to the system bandwidth.

Since the minimum system BW of the legacy LTE/LTE-A system consists of 6 PRBs, a PSS/SSS, a PBCH, and the like are transmitted through 72 subcarriers corresponding to the 6 PRBs. FIG. 14 below is a view for explaining a PRB set capable of transmitting a PSS/SSS and a PBCH according to the number of PRBs corresponding to the system bandwidth.

FIG. 14(a) shows a case in which a system bandwidth consists of an even number of PRBs (e.g., 12 PRBs), and thus a center frequency is located at a boundary between RB indices 5 and 6. That is, FIG. 14(a) shows a case in which the center frequency is located at the RB boundary.

FIG. 14(b) shows a case in which a system bandwidth consists of an odd number of PRBs (e.g., 15 PRBs), and thus a center frequency is located at the middle of RB index 7.

In FIG. 14(a) and FIG. 14(b), a PSS, SSS, and/or PBCH may be allocated to center 6 RBs. However, in FIG. 14(b), since the center frequency is located in RB 7, the PSS, SSS, and/or PBCH may be allocated to 7 RBs. In this case, in each of RB indices 4 and 10, a part of the RB may be included in the PRB set.

2.2 NB LTE Cell Search Method

Figure 15:
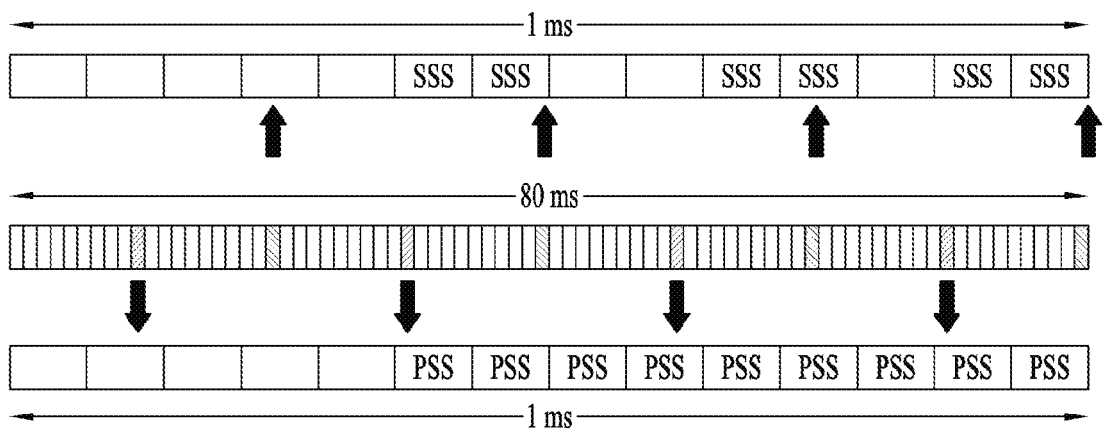
FIG. 15 is a view for explaining M-PSS and M-SSS frame structures used in an NB-IoT system.

FIG. 15 is a view for explaining M-PSS and M-SSS frame structures used in an NB-IoT system.

In the case of a cell search method of the NB-LTE system, the sequence design is appropriately modified to improve cell search performance, but the same principle used in the LTE/LTE-A is applied. FIG. 15 illustrates the structure of a cell synchronization sequence.

Referring to FIG. 15, one PSS is used for the M-PSS, and the M-PSS is transmitted in 9 OFDM symbols. In addition, the M-PSS is used to determine subframe timing and correct a frequency offset. In this case, the M-PSS is transmitted in the 9 OFDM symbols, which are consecutive in the time domain.

The M-SSS occupies 6 OFDM symbols and is used to determine a cell identity and M-frame timing. To support the same number of cell identity groups as in the LTE system, 504 different SSSs are designed.

From the sequence design shown in FIG. 15, it can be seen that the M-PSS and M-SSS are repeated on average every 20 ms and occur 4 times within an 80 ms block. In the case of the normal CP, in the subframes including the synchronization sequences, the M-PSS occupies the last 9 OFDM symbols, and the M-SSS occupies the $6^{th}$, $7^{th}$, $10^{th}$, $11^{th}$, $13^{th}$ and $14^{th}$ OFDM symbols. In the case of the extended CP, the M-SSS occupies $5^{th}$, $6^{th}$, $9^{th}$, $11^{th}$ and $12^{th}$ OFDM symbols.

The 9 OFDM symbols for the M-PSS are selected to support in-band deployment within an LTE carrier. This is because in the LTE system, the first 3 OFDM symbols are used to carry a PDCCH and a subframe consists of a minimum of 12 OFDM symbols (in the case of the extended CP). For the M-PSS, REs corresponding to REs where a CRS is transmitted in the LTE system are punctured to avoid a collision.

The M-PSS/M-SSS has a specific position to avoid a collision with legacy LTE signals such as a PDCCH, a PCFICH, a PHICH and an MBSFN. The design of the synchronization sequences in the NB-LTE system is slightly different from that in the LTE system. This is to make a compromise between faster synchronization and reduced memory consumption at a UE. In addition, since the 4 times repetition is performed during the 80 ms interval, the design needs to be slightly modified for the M-SSS to resolve timing uncertainty within the 80 ms interval.

2.3 Structure of M-PSS and M-SSS

In the LTE system, the PSS structure allows low complexity design of a time and frequency offset estimator, and the SSS is designed to obtain frame timing and support 504 unique cell identities.

Figure 16:
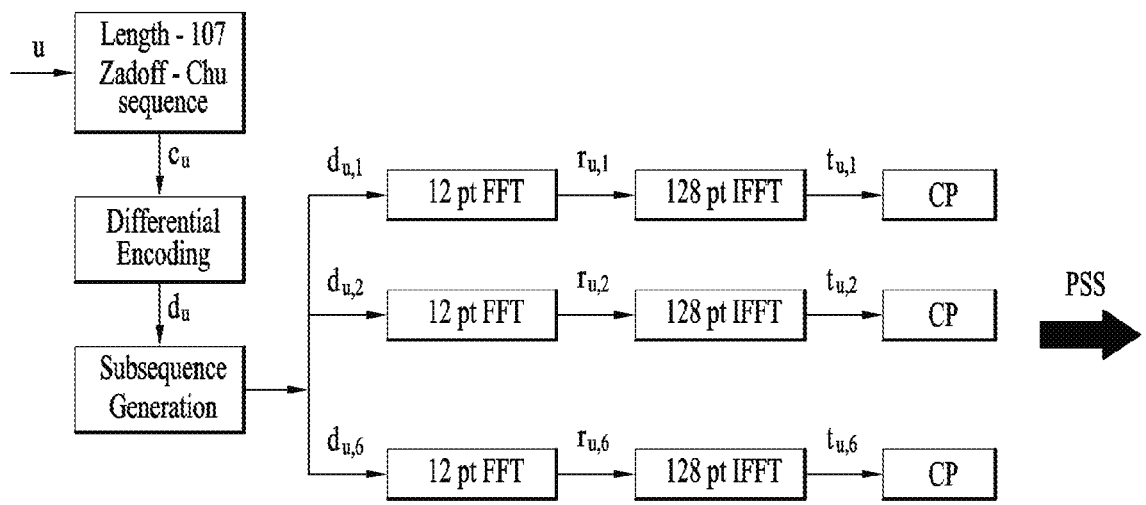
FIG. 16 is a view for explaining a procedure for generating an M-PSS.

FIG. 16 is a view for explaining a procedure for generating an M-PSS.

In the NB-LTE system, a single M-PSS is defined. In a PSS synchronization procedure, a specific number of frequency hypotheses are used for each PSS to roughly estimate symbol timing and a frequency offset. If the NB-LTE system adopts the same synchronization procedure as in the LTE system, it may cause high receiver processing complexity due to multiple frequency hypotheses.

To solve this problem, a Zadoff-Chu sequence that is similar to the conventional one in the time domain but different is proposed for the M-PSS. Due to differential encoding in a transmission stage, differential decoding is performed during a receiver processing procedure. As a result, the frequency offset is transformed from a continuous rotation over symbols to a fixed phase offset over symbols.

Referring to FIG. 16, a base sequence c(n) can be obtained from a Zadoff-Chu sequence of length 107 according to Equation 8.

$$c(n) = e^{-j\frac{\pi u n(n+1)}{N}}, n = \{0, 1, 2, \dots, 106\} \quad \text{[Equation 8]}$$

The base sequence c(n) is differentially encoded, and then a sequence d(n) is calculated as shown in Equation 9.

$$d(n+1)=d(n)c(n), n=\{0,1,2,\dots,106\}, d(0)=1 \quad \text{[Equation 9]}$$

The sequence d(n) is divided into 9 sub-sequences, each of which having length 12 and a sample rate of 180 kHz. A 12-point FFT is applied to each of the 9 sub-sequences, and then each sequence is oversampled 128/12 times using a zero-padded 128-point IFFT to achieve a sample rate of 1.92 MHz. As a result, the individual sequences are mapped to 12 subcarriers over 9 OFDM symbols, respectively.

Since each sub-sequence constitutes one OFDM symbol and there are 9 sub-sequences in total, the M-PSS occupies 9 OFDM symbols. When 9 normal CP samples are used, the total M-PSS length is equal to (128+9)*9+1=1234 samples.

On the other hand, when the extended cyclic prefix is applied, the total M-PSS length is equal to 1440 samples.

FIG. 16 shows a method for generating the M-PSS, and the actual M-PSS used during transmission may not need to be generated every time using the same complex procedure at a transmitter/receiver. The complex coefficients corresponding to the M-PSS can be generated offline, and these can then be stored directly at the transmitter/receiver. In addition, since even though the M-PSS is generated at 1.92 MHz, the occupied bandwidth is 180 kHz, the receiver may use a sampling rate of 192 kHz in performing all processing procedures related to estimation of the time and frequency offsets using the M-PSS.

By comparison with the LTE system, it can be seen that the frequency of occurrence of the M-PSS in the NB-LTE system is slightly larger than overhead for the PSS in the LTE system. In particular, the synchronization sequences used in the LTE system occupy 2.86% of the total transmission resources, and the synchronization sequences used in the NB-LTE system occupy approximately 5.36% of the total resources. This extra overhead comes with the advantage of reducing synchronization time as well as memory consumption, thereby leading to improved battery life and lower device cost.

Figure 17:
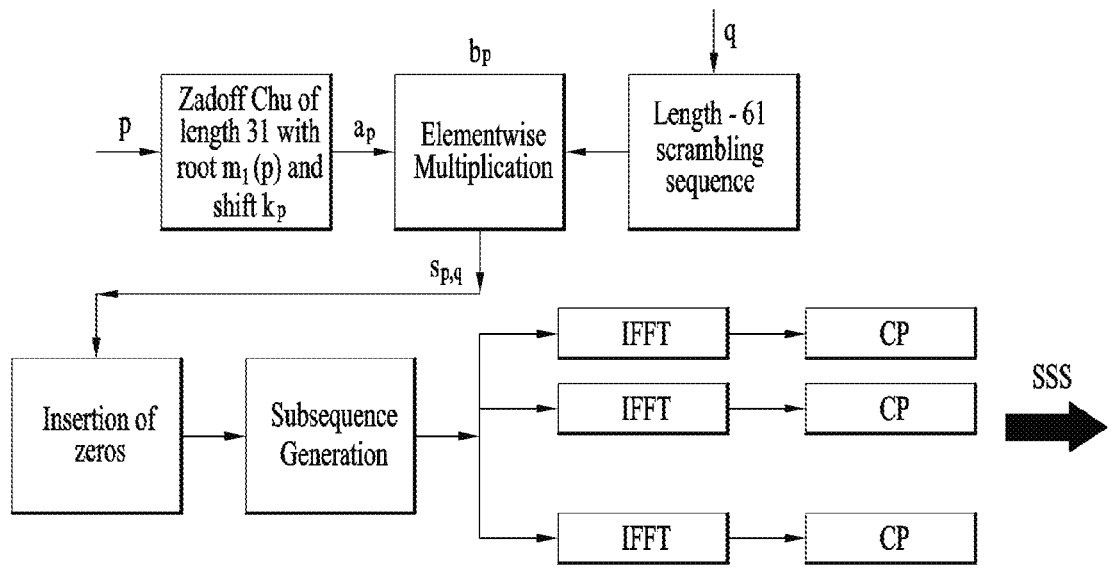
FIG. 17 is a view for explaining a procedure for generating an M-SSS.

FIG. 17 is a view for explaining a procedure for generating an M-SSS.

The M-SSS is designed in the frequency domain and occupies 12 subcarriers in each of 6 OFDM symbols. Thus, the number of REs used for the M-SSS is equal to 72. The M-SSS is composed of a single length 61 Zadoff Chu sequence, where 11 zeros are padded at the beginning thereof. In the case of the extended CP, the first two symbols of the M-SSS are not used, and the remaining symbols are mapped to available OFDM symbols. Since there are 11 zeros in the beginning, the unused area may be occurred in only one symbol from the length 61 sequence. In this case, the only one unused symbol may cause minor degradation in the correlation properties of the different SSS. A sequence and its cyclic shifts for different roots may be provided to support up to 504 unique cell identities. The reason for using Zadoff-Chu sequences in the NB-LTE system is to reduce a false detection rate compared to m-sequences in the LTE system. This is because use of the m-sequences in the LTE system requires additional processing procedures due to the presence of a common sequence for two different cell identity groups.

Since the M-PSS/M-SSS occur 4 times within an 80 ms block, the SSS design of the LTE system cannot provide accurate timing information within this block. This is because in the LTE system, a specific interleaving structure is used in determining only 2 positions, whereas in the NB-LTE system, 4 positions need to be determined. Therefore, 4 scrambling sequences are required to determine the 4 positions within the 80 ms block, and these 4 scrambling sequences may be used to obtain exact timing.

Referring to FIG. 17, $s_{p,q}(n)$ corresponding to the M-SSS is given as $a_p(n)b_q(n)$. In this case, p (p={0, 1, . . . , 503}) is used to indicates a cell identifier, and q (q={0, 1, 2, 3}) is used to determine a location of the M-SSS.

In addition, $a_p(n)$ is a Zadoff-Chu sequence and used to determine a cell identity group. A root $m_1(p)$ and a cyclic shift $k_p$ are used to provide a specific cell identity. In this case, $a_p(n)$ is defined as shown in Equation 10 below.

$$a_p(n) = 0, \quad n = \{0-4, 66-71\} \qquad \text{[Equation 10]}$$
$$= a_p(n - k_p - 5), \quad n = \{5, 6, \ldots, 65\}$$
$$a_p(n) = e^{-\frac{j\pi m(p)n(n+1)}{61}}, n = \{0, 1, \ldots, 61\}$$

Moreover, $b_q(n)$ is a scrambling sequence composed of cyclic shifts of a base sequence b(n), and it is used to indicate the M-SSS location within an M-frame to obtain frame timing. In this case, $b_q(n)$ is defined as shown in Equation 11 below.

$$b_q(n)=b(\mathrm{mod}(n-l_q,63)) \; n=\{0,1,\ldots 60\}, \; q=\{0,1,2,3\},$$
$$l_0=0, \; l_1=3, \; l_2=7, \; l_3=11$$

$$b(n+6)=\mathrm{mod}(b(n)+b(n+1),2), \; n=\{0,1,\ldots 55\}, b(0)$$
$$=1, \; b(m)=0, \; m=\{1,2,3,4,5\} \qquad \text{[Equation 11]}$$

In Equation 11, a cyclic shift lq is dependent on the value of q. The values of m(p) and $k_p$ for specific p are given as m(p)=1+mod(p, 61) and $$k_p = 7 \left\lfloor \frac{p}{61} \right\rfloor.$$

3. Method for Supporting in-Band Operation in NB-LTE System

In-band operation or in-band deployment mentioned in the embodiments of the present invention means the IoT technology for operating the NB-IoT technology in LTE bands. In the following description, a UE means an NB-IoT UE supporting the NB-IoT technology, and an eNB means an NB-IoT eNB supporting the NB-IoT technology. In addition, when the NB-IoT UE accesses the NB-IoT eNB that performs in-band operation or in-band deployment, the NB-IoT UE may be set to operate in an in-band deployment mode.

In the following embodiments of the present invention, to distinguish downlink/uplink physical channels supported by the NB-IoT eNB or NB-LTE system from downlink/uplink physical channels of the legacy LTE/LTE-A system, the name of the former channel is defined by adding a prefix such as "M-", "NB-", or "N-" to the name of the latter channel That is, the corresponding prefixes are used to indicate the physical channels used in the NB-IoT system. In addition, since the prefixes have the same meaning, they can be interchangeably used. Moreover, in this specification, 'A/B' can be interpreted to mean 'A', 'B', or 'A and B'.

3.1 Method 1 for Transmitting and Receiving Downlink Physical Channel in NB-LTE System According to an embodiment of the present invention, when in-band deployment is applied to the NB-LTE system, it is desired to match a boundary of the PRB configured and transmitted in the NB-LTE system with that of the PRB in the legacy LTE system.

Referring to FIG. 14, it can be seen that 12 subcarriers used for the NB-LTE may affect 1 or 2 PRBs of the legacy LTE system according to the number of PRBs corresponding to the system bandwidth. Thus, it is desirable that the NB-LTE system performs transmission by matching it with the PRB boundary of the LTE system in order to affect use of radio resources in the legacy LTE system.

In addition, when a UE intends to perform cell search using the PSS/SSS in the LTE system, the UE attempts PSS/SSS detection by moving the center frequency in unit of 100 kHz to perform the cell search. In this case, it is preferable that the M-PSS/M-SSS of the NB-LTE system is transmitted in the PRB having the boundary matching the PRB boundary in the LTE system and satisfying center frequency raster of 100 kHz. In addition, the center frequency raster of 100 kHz may be set as a cell search unit of the NB-IoT UE.

For example, assuming that the bandwidth of the legacy LTE system consists of 15 PRBs, the center frequency is located at the center of PRB #7 of FIG. 14(b). In this case, to match the 100 kHz raster and the PRB boundary (e.g., 180 kHz unit), the M-PSS/M-SSS of the NB-LTE system may be configured to be transmitted in the PRB located away from the center frequency at a multiple of 900 kHz (e.g., PRB #2, PRB #12). That is, the M-PSS/M-SSS may be configured to be transmitted in the PRB with the index corresponding to the least common multiple of the cell search unit and the PRB unit in the NB-LTE system.

When the system bandwidth is changed, the PRB index for transmitting a signal of the NB-LTE system can be calculated in the same manner Alternatively, the center frequency for transmitting a signal of the NB-LTE system can be designated in advance. In this case, since an NB-LTE UE can perform the cell search operation with respect to only the designated frequency instead of performing the cell search in unit of 100 kHz, the UE can simply complete the cell search operation. For example, a UE may obtain the frequency designated for the UE based on a bandwidth size, a bandwidth location, a cell search unit, a PRB size, etc. and perform the cell search with respect to only the designated frequency.

In this case, if an eNB intends to transmit physical channels (e.g., M-PSS, M-SSS, M-PBCH, M-PDCCH, M-EPDCCH, M-PDSCH, etc.), the eNB may perform transmission by matching a PRB boundary for the physical channels with the PRB boundary of the legacy LTE system, and the UE may receive the physical channels based on the PRB boundary of the legacy LTE system.

3.2 Method 2 for Transmitting and Receiving Downlink Physical Channel in NB-LTE System According to another embodiment of the present invention, the M-PSS/M-SSS and M-PBCH can be configured to be transmitted without matching with the PRB boundary of the LTE system. In this case, it is preferred not to transmit the M-PSS/M-SSS and M-PBCH in the center 6 PRBs or the 72 subcarriers corresponding to all the center 6 PRB, where the PSS/SSS, and/or PBCH of the legacy LTE system are transmitted. The reason for this is to secure the performance of the PSS/SSS and/or PBCH and not to affect the performance of the NB-LTE system.

Since the UE obtains information on a serving cell by performing the cell search, the eNB may perform NB-LTE transmission by matching the M-PDCCH/M-EPDCCH and M-PDSCH with the PRB boundary of the legacy LTE system. This comes with the advantage of using the existing implementation, where the UE performs the cell search in unit of the 100 kHz raster. In this case, information on the PRB carrying the M-PDCCH/M-EPDCCH and M-PDSCH may be transmitted through the M-PBCH.

That is, the eNB may transmit physical channels (e.g., M-PSS/M-SSS, M-PBCH, etc.) for transmitting synchronization and system information among the physical channels without matching with the PRB boundary of the legacy LTE system and transmit control channels for transmitting and receiving data and data channels (e.g., M-PDCCH/M-EPDCCH, M-PDSCH, etc.) through matching with the PRB boundary of the legacy LTE system.

3.3 Method 3 for Transmitting and Receiving Downlink Physical Channel in NB-LTE System According to a further embodiment of the present invention, the eNB can transmit only the M-PSS/M-SSS without matching with the PRB boundary of the legacy LTE system and transmit the M-PBCH, M-PDCCH/M-EPDCCH, and M-PDSCH by matching with the RPB boundary.

In this case, the PRB carrying the M-PBCH, M-PDCCH/M-EPDCCH, and M-PDSCH may be designated in advance or obtained from the hypothesis of the M-PSS/M-SSS.

Alternatively, the UE may obtain information on the PRB carrying the M-PBCH from the hypothesis of the M-PSS/M-SSS and obtain information on the PRB carrying the M-PDCCH/M-EPDCCH and/or M-PDSCH from the M-PBCH.

3.4 System Information Transmission Method

The eNB may transmit, to the NB-IoT UE, information indicating that the NB-IoT system is in the in-band deployment mode using a signal (e.g., RRC signal, M-SIB, M-MIB, etc.) transmitted from an RRC, physical layer (i.e., L1) signaling, or the like.

In the LTE system, the eNB does not transmit CRS information. However, in the NB-LTE system, the eNB is able to inform that the NB-IoT UE can operate in the in-band deployment mode by transmitting the CRS information (e.g., frequency shift (v-shift) value, etc.).

3.5 M-PBCH Transmission and Reception Method

In the legacy LTE system, the PBCH may be demodulated using the CRS. In the NB-LTE system, assuming that the M-PBCH is transmitted in only 12 subcarriers corresponding to the center 1 PRB, the UE can demodulate the M-PBCH using the CRS.

However, if the M-PBCH is transmitted in a different PRB rather than the center 1 PRB of the legacy LTE system or in PRBs, the NB-LTE UE (i.e., NB-IoT UE) cannot know a PRB index of the different PRB and thus cannot decode the M-PBCH using the CRS of the legacy LTE system.

Hereinafter, a description will be given of methods for enabling a UE and/or an eNB operating in the in-band deployment mode to transmit and receive the M-PBCH in a random PRB(s) other than the center 1 PRB of the legacy LTE system.

3.5.1 M-PBCH Transmission and Reception Method in Consideration of Legacy CRS

The eNB can use a differential modulation scheme capable of non-coherent detection as an M-PBCH modulation scheme. In this case, if an RE in which the M-PBCH is transmitted overlaps with an RE in which the legacy CRS is transmitted, the following M-PBCH transmission and reception methods can be considered as alternatives.

3.5.1.1 Method 1-1

It is assumed that the eNB and/or UE can obtain a frequency shift (v-shift or $v_{shift}$) value of the legacy CRS from a cell ID acquired from the M-PSS/M-SSS. In addition, the eNB and/or UE can assume the maximum CRS antenna port number supportable by the legacy LTE as a specific number (e.g., 2 or 4). In this case, the eNB is able to perform rate matching instead of mapping the M-PBCH to the RE to which the CRS is allocated.

At this time, it is assumed that the v-shift value of the legacy CRS is equal to a v-shift value that can be obtained from the N-Cell ID acquired from the M-PSS/M-SSS. This is because if a cell ID of the LTE system is equal to an N-Cell ID of the NB-LTE system, the same v-shift value can be acquired.

However, the N-Cell ID that is detected by the NB-IoT UE in the in-band deployment mode from the M-PSS/M-SSS may be different from the legacy cell ID. In this case, when the cell ID of the LTE system is different from the N-Cell ID of the NB-LTE system, the UE may assume that the v-shift value of the LTE system is the same with the v-shift value of the NB-LTE system. In addition, when the legacy cell ID is different from the N-Cell ID of the NB-LTE system, the NB-LTE system may set the N-Cell ID such that the v-shift values calculated from the two IDs become equal to each other.

Hereinafter, Method 1-1 will be described again in detail with reference to FIG. 18.

Figure 18:
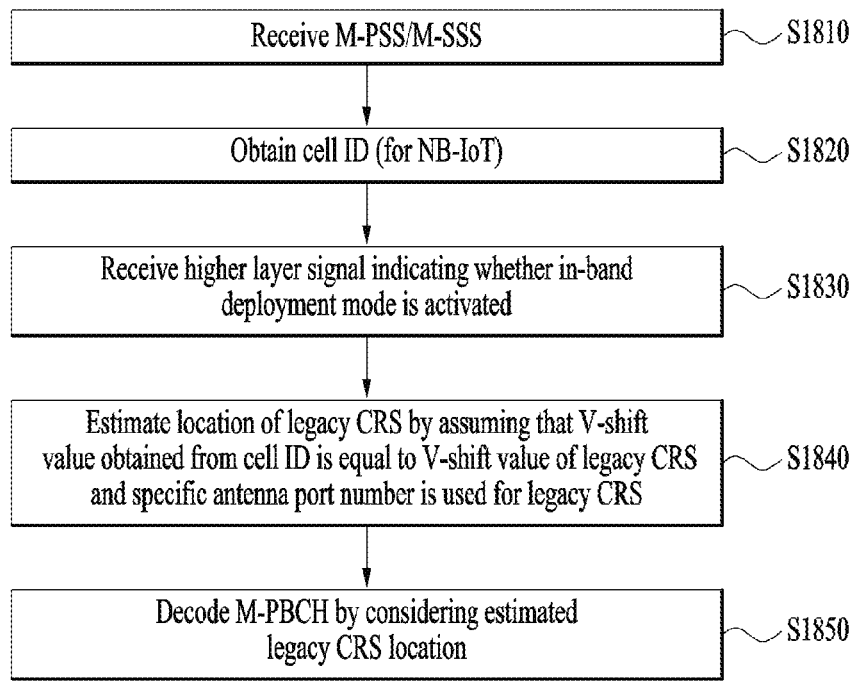
FIG. 18 is a view for explaining a method for transmitting and receiving an M-PBCH.

FIG. 18 is a view for explaining a method for transmitting and receiving the M-PBCH.

Referring to FIG. 18, the UE can match time and frequency synchronization by receiving the M-PSS/M-SSS from a serving cell [S1810] and then obtain the N-Cell ID of the NB-LTE system from the received M-PSS and/or M-SSS [S1820].

The NB-IoT UE may receive a higher layer signal (e.g., MIB, RRC layer signal, etc.) indicating whether the corresponding NB-IoT UE is in the in-band deployment mode. In this case, the corresponding higher layer signal can indicate that the NB-IoT UE is set to operate in the in-band deployment mode [S1830].

The UE set to operate in the in-band deployment mode can assume that the v-shift value obtained from the N-Cell ID of the corresponding serving cell is equal to the v-shift value for the legacy CRS of the LTE system. In addition, the UE can estimate an allocation location of the legacy CRS by assuming a specific antenna port(s) for the legacy CRS and the number of specific antenna ports (e.g., 2 or 4) [S1840].

In FIG. 18, if the locations of REs to which the legacy CRS or an M-CRS is mapped overlap with those of REs to which the M-PBCH is mapped, the eNB may puncture the overlapping M-PBCH REs and then perform transmission. Alternatively, the eNB may not map the M-PBCH to the REs to which the legacy CRS (or M-CRS) will be allocated and then perform rate matching on the remaining REs in order to transmit the M-PBCH. Thus, the UE may decode the M-PBCH by considering the estimated location of the legacy CRS. For example, the UE can receive and decode the M-PBCH using the remaining REs by assuming that the M-PBCH is not allocated to the estimated REs where the legacy CRS is allocated [S1850].

In FIG. 18, in the same serving cell, the N-Cell ID obtained from the M-PSS/M-SSS transmitted in the NB-LTE system may be set to be equal to or different from a cell ID of the legacy LTE system. If the legacy cell ID is different from the N-Cell ID in the same serving cell, the NB-LTE system may set the N-Cell ID such that the same v-shift value is derived.

3.5.1.2 Method 1-2

The UE and/or eNB may not adopt the assumption that the v-shift value of the legacy CRS can be obtained from the N-Cell ID acquired from the M-PSS/M-SSS. In this case, the eNB may puncture an M-PBCH RE overlapping with an RE to which the legacy CRS is allocated and then perform transmission.

In this case, an NB-LTE CRS (i.e., M-CRS) can be introduced to allow the UE to decode the M-PBCH.

Here, the M-CRS may be scrambled using the N-Cell ID obtained from the M-PSS/M-SSS.

3.5.2 M-PBCH Transmission and Reception Method in Consideration of M-CRS Newly Defined in NB-IoT System In an embodiment of the present invention, an M-CRS (it can be also called N-RS or NB-CRS) can be newly defined to enable a UE to decode the M-PBCH. In this case, the M-CRS may be scrambled using the N-Cell ID obtained from the M-PSS/M-SSS. In addition, the number of antenna ports for transmitting the M-CRS can be assumed to be a specific value (e.g., 1 or 2).

If the RE in which the M-PBCH is transmitted overlaps with the RE in which the CRS of the legacy LTE system and/or the M-CRS is transmitted, the eNB may transmit the M-PBCH using Method 1-1 or Method 1-2 in the foregoing description.

Figure 19:
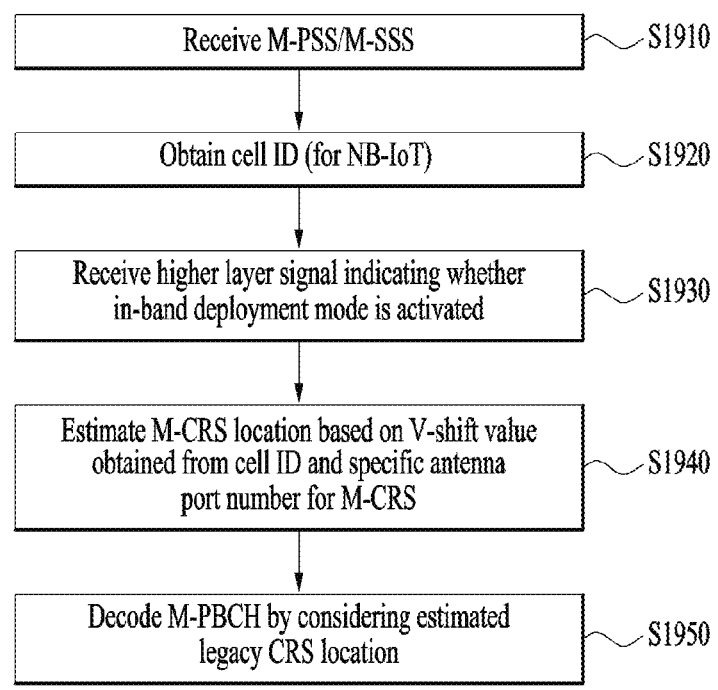
FIG. 19 is a view for explaining another method for transmitting and receiving an M-PBCH.

FIG. 19 is a view for explaining another method for transmitting and receiving the M-PBCH.

Referring to FIG. 19, the UE can match time and frequency synchronization by receiving the M-PSS/M-SSS from a serving cell [S1910] and then obtain the N-Cell ID of the NB-LTE system from the received M-PSS and/or M-SSS [S1920].

The NB-IoT UE may receive a higher layer signal (e.g., MIB, RRC layer signal, etc.) indicating whether the corresponding NB-IoT UE is in the in-band deployment mode. In this case, the corresponding higher layer signal can indicate that the NB-IoT UE is in the in-band deployment mode [S1930].

The UE operating in the in-band deployment mode can obtain a v-shift value for the M-CRS from the N-Cell ID obtained in the step S1920. In addition, the UE can estimate a location of the M-CRS based on the obtained v-shift value and the number of specific antenna ports for the M-CRS (i.e., NB-CRS) [S1940].

In the step S1940, the UE may assume the number of antenna ports for the M-CRS as a specific value (e.g., 1 or 2) to receive the M-CRS.

In FIG. 19, if the locations of REs to which the M-CRS is mapped overlap with those of REs to which the M-PBCH is mapped, the eNB may puncture the overlapping M-PBCH REs and then perform transmission. Alternatively, the eNB may not map the M-PBCH to the REs to which the M-CRS will be allocated and then perform rate matching on the remaining REs in order to transmit the M-PBCH. Thus, the UE may decode the M-PBCH by considering the estimated location of the M-CRS. For example, the UE can receive and decode the M-PBCH by assuming that the number of antenna ports for the M-CRS transmission is equal to the specific value and the M-PBCH is not transmitted in the estimated REs where the M-CRS is transmitted [S1950].

The embodiments described in sections 3.1 and 3.2 can be implemented independently or together. The structure of the legacy CRS is not against that of the M-CRS, and the legacy CRS may be used to support the backward compatibility. Therefore, the legacy CRS and M-CRS can be transmitted in the same subframe.

Moreover, in the LTE/LTE-A system, legacy CRS are sequentially mapped to antenna ports 0 to 4, and M-CRSs are sequentially mapped to antenna ports 0 and 1. Thus, if a UE knows a specific value that means the maximum CRS antenna port number or M-CRS antenna port number, the UE can check antenna ports used for legacy CRS or M-CRS transmission.

3.6 Method for Transmitting and Receiving Uplink Physical Channel in NB-LTE System The in-band deployment mode can be applied to uplink in the NB-LTE system. For example, among signals transmitted in uplink in the legacy LTE system, an SRS, a PUCCH, and/or a PUSCH may be considered as signals and channels that may affect an M-PUSCH and/or an M-PRACH.

First, in the case of a subframe in which a legacy SRS is transmitted, i.e., a cell-specific SRS subframe, relevant information may be transmitted to a legacy LTE UE through RRC signaling. Similarly, the information on the cell-specific SRS subframe needs to be signaled to the NB-LTE UE. That is, the NB-IoT UE may receive position information of the legacy cell-specific SRS subframe where the legacy SRS is transmitted.

In addition, when the NB-IoT UE transmits the M-PUSCH in the legacy cell-specific SRS subframe, it is preferred to perform rate matching such that data (M-PUSCH) is not transmitted in the last transmission symbol where the legacy SRS is transmitted.

When the M-PRACH is transmitted in the legacy cell-specific SRS subframe, the following methods can be considered.

(1) Method 1

The UE may perform rate matching so that data is not transmitted in the last transmission symbol, where the M-PRACH is transmitted. That is, when the UE transmits the M-PRACH in the subframe designated as the legacy cell-specific SRS subframe, it is desirable that the UE does not transmit the M-PRACH in the last symbol of the corresponding subframe.

(2) Method 2

Time resources for transmitting the M-PRACH may not be configured in the legacy cell-specific SRS subframe.

(3) Method 3

When the UE is set to operate in the in-band deployment mode, the UE may be configured not to transmit data in the last transmission symbol of the subframe in which the M-PRACH is transmitted regardless of whether it is the legacy cell-specific SRS subframe.

However, when the NB-IoT UE is not in the in-band deployment mode, the NB-IoT UE can transmit the M-PRACH using all the symbols of the legacy cell-specific SRS subframe.

Therefore, in the above-mentioned embodiments, the eNB may transmit, to the NB-IoT UE, a signal indicating that the corresponding UE has been set to operate in the in-band deployment mode through M-SIB/M-RRC/L1 signaling.

3.7 Method for Transmitting M-PUSCH in NB-LTE System

Hereinafter, a description will be given of methods for transmitting the M-PUSCH in the NB-LTE system. In this case, it is preferable that the eNB transmits, to the NB-LTE UE, information on a PRB in which the M-PUSCH is transmitted in uplink.

(1) Method 1

The UE transmits the M-PUSCH using resources (e.g., PRBs) which was used to transmit the M-PRACH.

(2) Method 2

After successfully transmitting the M-PRACH, the UE may transmit the M-PUSCH using radio resources for transmitting message 3 used during the PRACH process (3) Method 3

The UE may obtain PRB information to be used for transmitting the M-PUSCH from PRB information used for downlink transmission.

Thereafter, the UE can transmit the M-PUSCH based on the obtained PRB information.

(4) Method 4

Information on radio resources to be used for transmitting the M-PUSCH can be informed the NB-LTE UE through M-SIB/RRC/L1 signaling.

In summary, the NB-LTE UE can transmit the M-PUSCH to the eNB based on the radio resource information obtained according to the above-described embodiments, i.e., Method 1 to Method 4.

4. Apparatuses

Apparatuses illustrated in FIG. 20 are means that can implement the methods described before with reference to FIGS. 1 to 19.

A UE may act as a transmission end on a UL and as a reception end on a DL. An eNB may act as a reception end on a UL and as a transmission end on a DL.

That is, each of the UE and the eNB may include a Transmitter (Tx) 2040 or 2050 and a Receiver (Rx) 2060 or 2070, for controlling transmission and reception of information, data, and/or messages, and an antenna 2000 or 2010 for transmitting and receiving information, data, and/or messages.

Each of the UE and the eNB may further include a processor 2020 or 2030 for implementing the afore-described embodiments of the present disclosure and a memory 2080 or 2090 for temporarily or permanently storing operations of the processor 2020 or 2030.

The embodiments of the present invention can be implemented based on the above-described components and functions of the UE and the eNB. For example, a UE for receiving a physical downlink broadcast channel (M-PBCH) in a wireless access system supporting a narrowband Internet of Things (NB-IoT) system may include a receiver and a processor configured to control the receiver. In this case, the processor may be configured to: receive a higher layer signal indicating an in-band deployment mode by controlling the receiver; receive a narrowband primary synchronization signal (M-PSS) and a narrowband secondary synchronization signal (M-SSS), which are configured for the NB-IoT system, by controlling the receiver; obtain a cell identifier (N-Cell ID) of the NB-IoT system from the M-PSS and the M-SSS; and receive the M-PBCH using the N-Cell ID in the in-band deployment mode by controlling the receiver. In this case, the in-band deployment mode may indicate that the NB-IoT system is set in a band of the LTE system. In addition, to receive the M-PBCH, the processor may be further configured to: calculate a frequency shift (v-shift) value for a cell-specific reference signal (CRS) of the legacy system using the N-Cell ID; and estimate resource elements (REs) to which the CRS is allocated by considering the v-shift value. In this case, the processor may calculate the v-shift value by assuming the maximum CRS antenna port number that can be supported by the legacy system. Moreover, to receive the M-PBCH, the processor may be configured to: calculate a frequency shift (v-shift) value for a cell-specific reference signal (M-CRS) of the MB-IoT system using the N-Cell ID; and estimate REs to which the M-CRS is allocated by considering the v-shift value. Further, the processor may be configured to receive the M-PBCH in a resource region except the REs to which the CRS is allocated and the REs to which the M-CRS is allocated by controlling the receiver. Details can be found in sections 1 and 3.

The Tx and Rx of the UE and the eNB may perform a packet modulation/demodulation function for data transmission, a high-speed packet channel coding function, OFDM packet scheduling, TDD packet scheduling, and/or channelization. Each of the UE and the eNB of FIG. 20 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 2080 or 2090 and executed by the processor 2020 or 2030. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The present disclosure is applicable to various wireless access systems including a 3GPP system, a 3GPP2 system, and/or an IEEE 802.xx system. Besides these wireless access systems, the embodiments of the present disclosure are applicable to all technical fields in which the wireless access systems find their applications.

What is claimed is:

1. A method for receiving a signal by a user equipment (UE) in a narrowband internet of things (NB-IoT) system, the method comprising:
   receiving a narrowband secondary synchronization signal (N-SSS) to obtain a narrowband cell identifier (N-Cell ID),
   wherein the N-SSS is received based on performing cell search operation with respect to a center frequency configured for NB-IoT system instead of performing the cell search operation in a unit of a center frequency raster configured for a legacy long term evolution (LTE) system, wherein the center frequency configured for the NB-IoT system is preconfigured;
   obtaining information regarding the center frequency configured for the NB-IoT system based on a bandwidth size, a bandwidth location, a cell search unit and a physical resource block size before performing the cell search operation;
   receiving a narrowband physical broadcast channel (N-PBCH) based on the N-Cell ID; and
   receiving, on a narrowband physical downlink shared channel (N-PDSCH), a system information block comprising information on an inband deployment mode after the receiving of the N-PBCH, and
   wherein the inband deployment mode denotes an operation mode that a band of the NB-IoT system is within a band of the LTE system.

2. The method of claim 1, further comprising:
   determining, based on the N-Cell ID being different from a Cell ID regarding the legacy LTE system, a frequency shift (v-shift) value for a cell-specific reference signal (CRS) of the legacy LTE system; and
   determining, based on the v-shift value, resource elements (REs) to which the CRS is allocated.

3. The method of claim 2, wherein the v-shift value is determined by assuming a maximum CRS antenna port number that can be supported by the legacy LTE system.

4. The method of claim 3, further comprising receiving the N-PBCH in a resource region except the REs to which the CRS is allocated.

5. The method of claim 1, further comprising:
   determining, based on the N-Cell ID being different from a Cell ID regarding the legacy LTE system, a frequency shift (v-shift) value for a narrowband cell-specific reference signal (N-CRS) of the NB-IoT system; and
   determining, based on the v-shift value, resource elements (REs) to which the N-CRS is allocated.

6. The method of claim 5, wherein the v-shift value is determined by assuming a number of antenna ports through which the (N-CRS) is received to be equal to a specific value.

7. The method of claim 5, further comprising receiving the N-PBCH in a resource region except the REs to which the N-CRS is allocated.

8. The method of claim 1, further comprising:
   determining, based on the N-Cell ID being different from a Cell ID regarding the legacy LTE system, a frequency shift (v-shift) value for a narrowband cell-specific reference signal (N-CRS) of the NB-IoT system; and
   determining, based on the v-shift value, REs to which the N-CRS is allocated,
   wherein the N-PBCH is received in a resource region except REs to which a CRS is allocated and the REs to which the N-CRS is allocated.

9. The method of claim 1, further comprising receiving a narrowband primary synchronization signal (N-PSS),
wherein the N-PSS, the N-SSS, and the N-PBCH are configured not to be received in 6 center physical resource blocks (PRBs) of the legacy LTE system.

10. A user equipment (UE) for receiving a signal in a narrowband internet of things (NB-IoT) system, the UE comprising:
a memory; and
at least one processor coupled with the memory and configured to:
receive a narrowband secondary synchronization signal (N-SSS) to obtain a narrowband cell identifier (N-Cell ID);
receive a narrowband physical broadcast channel (N-PBCH) based on the N-Cell ID,
wherein the N-SSS is received based on performing cell search operation with respect to a center frequency configured for NB-IoT system instead of performing the cell search operation in a unit of a center frequency raster configured for a legacy long term evolution (LTE) system, wherein the center frequency configured for the NB-IoT system is pre-configured;
obtain information regarding the center frequency configured for the NB-IoT system based on a bandwidth size, a bandwidth location, a cell search unit and a physical resource block size before performing the cell search operation; and
receive, on a narrowband physical downlink shared channel (N-PDSCH), a system information block comprising information on an inband deployment mode after the receiving of the N-PBCH,
wherein the inband deployment mode denotes an operation mode that a band of the NB-IoT system is within a band of the LTE system.

11. The UE of claim 10, wherein the at least one processor is further configured to:
determine, based on the N-Cell ID being different from a Cell ID regarding the legacy LTE system, a frequency shift (v-shift) value for a cell-specific reference signal (CRS) of the legacy LTE system; and
determine, based on the v-shift value, resource elements (REs) to which the CRS is allocated.

12. The UE of claim 11, wherein the at least one processor is further configured to determine the v-shift value by assuming a maximum CRS antenna port number that can be supported by the legacy LTE system.

13. The UE of claim 12, wherein the at least one processor is further configured to receive the N-PBCH in a resource region except the REs to which the CRS is allocated.

14. The UE of claim 10, wherein the at least one processor is further configured to:
determine, based on the N-Cell ID being different from a Cell ID regarding the legacy LTE system, a frequency shift (v-shift) value for a narrowband cell-specific reference signal (N-CRS) of the NB-IoT system; and
determine, based on the v-shift value, resource elements (REs) to which the N-CRS is allocated.

15. The UE of claim 14, wherein the at least one processor is further configured to determine the v-shift value by assuming a number of antenna ports through which the N-CRS is transmitted to be equal to a specific value.

16. The UE of claim 10, wherein the at least one processor is further configured to receive a narrowband primary synchronization signal (N-PSS),
wherein the N-PSS, the N-SSS, and the N-PBCH are configured not to be received in 6 center physical resource blocks (PRBs) of the legacy LTE system.

17. The method of claim 1, further comprising:
receiving information on a subframe configured to transmit a sounding reference signal (SRS) in the legacy LTE system; and
transmitting, in the inband deployment mode, a narrowband physical uplink shared channel (N-PUSCH) on the subframe except a last symbol included in the subframe.

18. A base station (BS) for transmitting and receiving a signal in a narrowband internet of things (NB-IoT) system, the BS comprising:
a memory; and,
at least one processor coupled with the memory and configured to:
transmit a narrowband secondary synchronization signal (N-SSS) to obtain a narrowband cell identifier (N-Cell ID),
wherein the N-SSS is transmitted based on performing cell search operation with respect to a center frequency configured for NB-IoT system instead of performing the cell search operation in a unit of a center frequency raster configured for a legacy long term evolution (LTE) system, wherein the center frequency configured for the NB-IoT system is pre-configured;
obtain information regarding the center frequency configured for the NB-IoT system based on a bandwidth size, a bandwidth location, a cell search unit and a physical resource block size before performing the cell search operation;
transmit a narrowband physical broadcast channel (N-PBCH) based on the N-Cell ID; and
transmit, on a narrowband physical downlink shared channel (N-PDSCH), a system information block comprising information on an inband deployment mode after the transmission of the N-PBCH,
wherein the inband deployment mode denotes an operation mode that a band of the NB-IoT system is within a band of the LTE system.

* * * * *